(12) United States Patent
Bridges et al.

(10) Patent No.: US 7,974,531 B2
(45) Date of Patent: Jul. 5, 2011

(54) SYSTEM AND METHOD FOR GENERATING A VISUAL REPRESENTATION OF A WAVELENGTH DIVISION MULTIPLEXING OPTICAL NETWORK AND NODES THEREOF

(75) Inventors: Dewayne Bridges, Plano, TX (US); Jerome Brette, Richardson, TX (US)

(73) Assignee: Alcatel Lucent, Paris (FR)

( * ) Notice: Subject to any disclaimer, the term of this patent is extended or adjusted under 35 U.S.C. 154(b) by 879 days.

(21) Appl. No.: 11/781,429

(22) Filed: Jul. 23, 2007

(65) Prior Publication Data

US 2009/0030664 A1 Jan. 29, 2009

(51) Int. Cl.
*H04J 14/02* (2006.01)

(52) U.S. Cl. .......................................... 398/34; 715/763

(58) Field of Classification Search ............... 398/9, 25, 398/34; 715/763
See application file for complete search history.

(56) References Cited

U.S. PATENT DOCUMENTS

| | | | |
|---|---|---|---|
| 7,124,368 B1 * | 10/2006 | Subramanian et al. | 715/736 |
| 7,650,073 B2 * | 1/2010 | Burnett et al. | 398/31 |
| 2003/0112958 A1 * | 6/2003 | Beaudoin et al. | 379/221.15 |
| 2003/0130821 A1 * | 7/2003 | Anslow et al. | 702/186 |
| 2003/0180042 A1 | 9/2003 | Nelles et al. | |
| 2004/0107277 A1 | 6/2004 | Levesque et al. | |
| 2006/0168117 A1 * | 7/2006 | Paparella et al. | 709/218 |
| 2009/0030664 A1 * | 1/2009 | Bridges et al. | 703/5 |

OTHER PUBLICATIONS

Wei, et al.; "Network Control and Management of Reconfigurable WDM All-Optical Network", IEEE, Network Operations and Management Symposium, vol. 3; Feb. 15, 1998; pp. 880-889.
PCT International Search Report dated Apr. 17, 2009.

* cited by examiner

*Primary Examiner* — Leslie Pascal
(74) *Attorney, Agent, or Firm* — Hitt Gaines, PC

(57) ABSTRACT

Systems for, and methods of, generating a visual representation of a wavelength division multiplexing (WDM) optical network and nodes thereof. In one embodiment, a system for generating a visual representation of multiple nodes of a WDM optical network includes: (1) a connectivity, pass-through and error identifier configured to identify connectivity and any pass-throughs and termination errors with respect to at least some nodes of the WDM optical network and (2) a connectivity, pass-through and error displayer coupled to the connectivity, pass-through and error identifier and configured to generate the visual representation that indicates the connectivity and the any pass-throughs and termination errors.

12 Claims, 35 Drawing Sheets

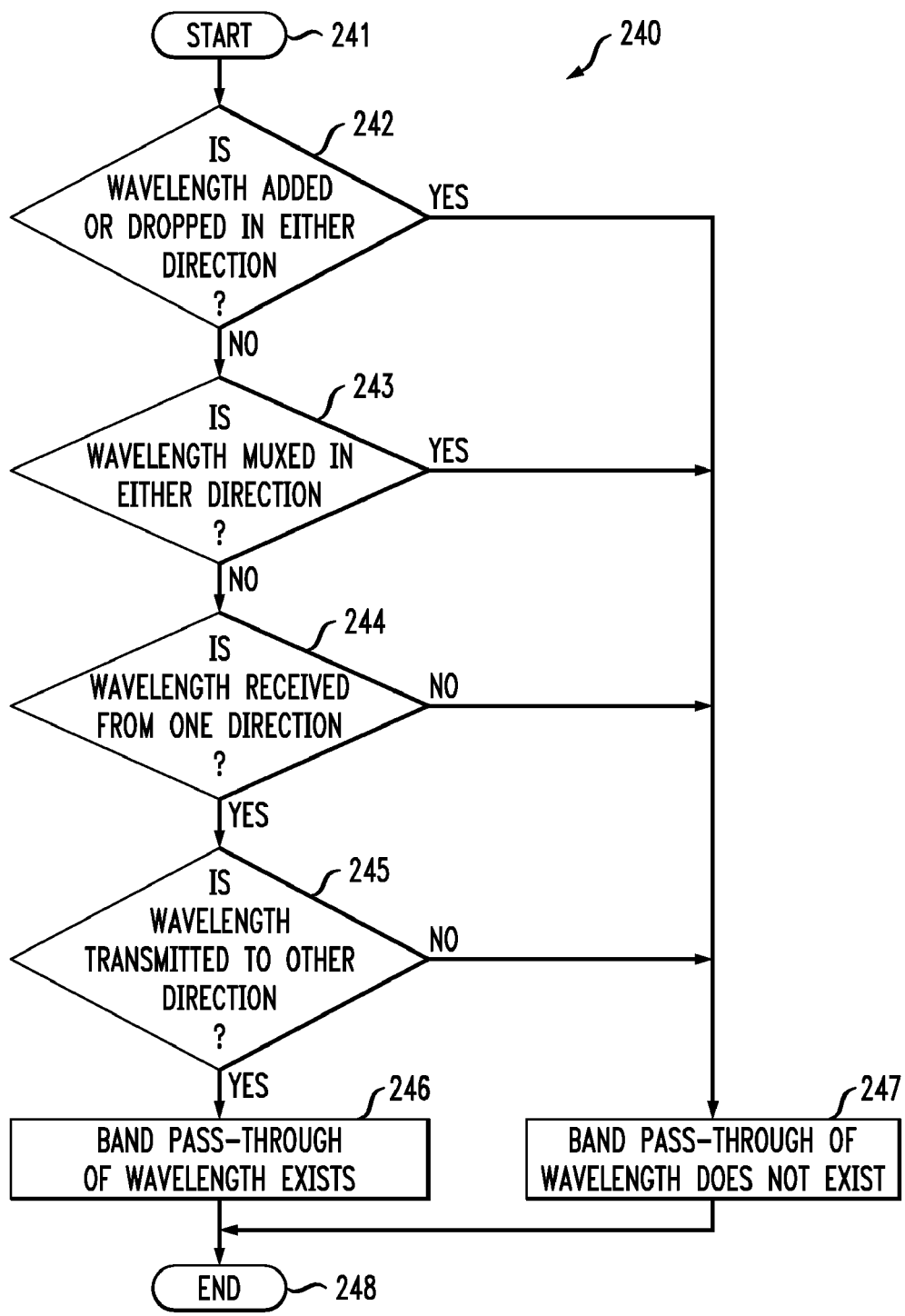

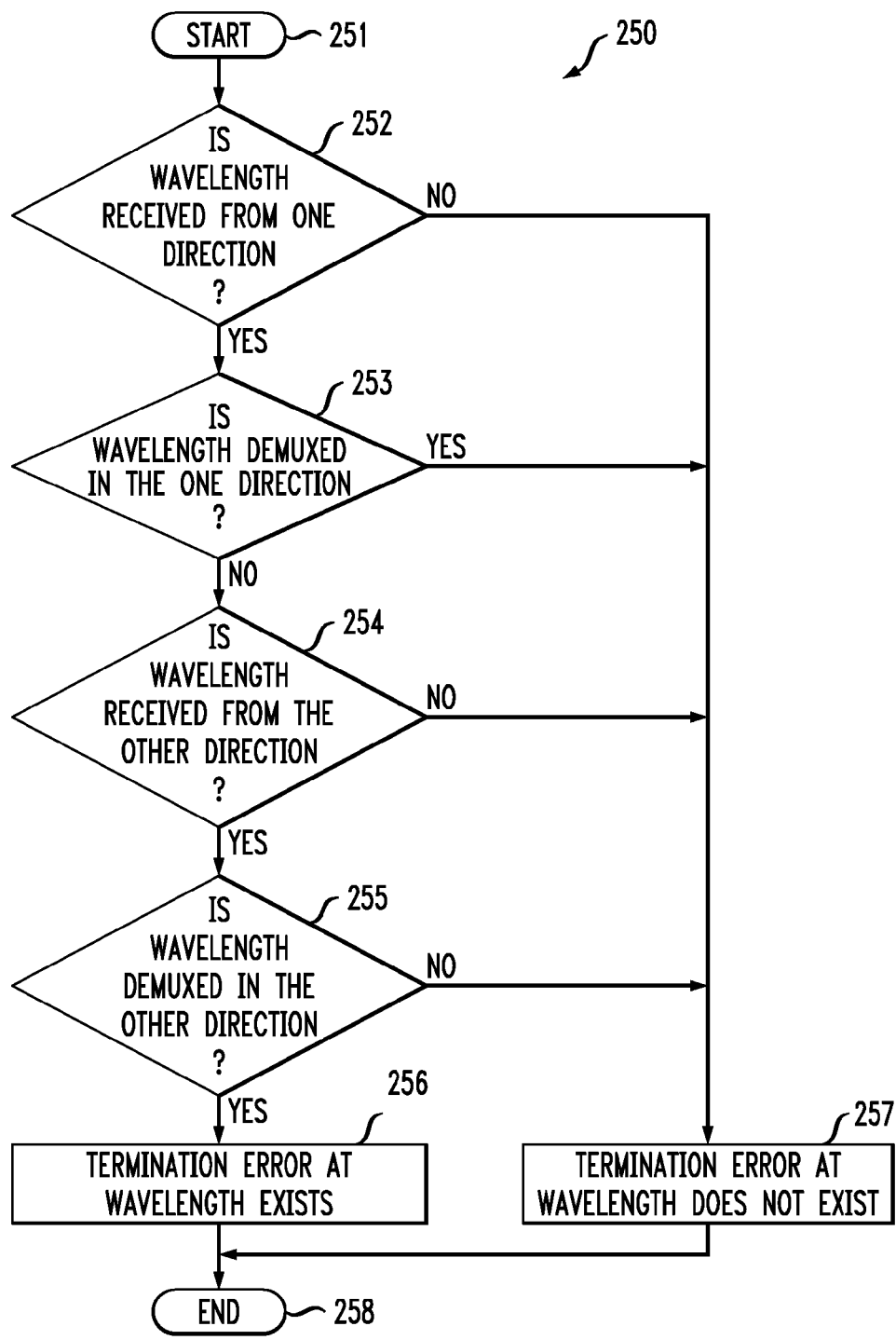

FIG. 6A

| | TID | AID | ENTITYTYPE | RACKNUM | SHELFNUM | SUBSHELFNUM | SLOTNUM | SUBSLOTNUM |
|---|---|---|---|---|---|---|---|---|
| 298 | PSC1696-3 | EC-1-1-1 | EC | 1 | 1 | -1 | 1 | -1 |
| 299 | PSC1696-3 | EQUIPPED_SLOT-1-1-2 | EQUIPPED_SLOT | 1 | 1 | -1 | 2 | -1 |
| 300 | PSC1696-3 | OMD-1-1-3 | OMD | 1 | 1 | -1 | 3 | -1 |
| 301 | PSC1696-3 | MCC-1-1-4 | MCC | 1 | 1 | -1 | 4 | -1 |
| 302 | PSC1696-3 | MCC-1-1-5 | MCC | 1 | 1 | -1 | 5 | -1 |
| 303 | PSC1696-3 | MCC-1-1-5-1 | MCC | 1 | 1 | -1 | 5 | 1 |
| 304 | PSC1696-3 | TDM-1-1-6 | TDM | 1 | 1 | -1 | 6 | -1 |
| 305 | PSC1696-3 | TDM-1-1-6-1 | TDM | 1 | 1 | -1 | 6 | 1 |
| 306 | PSC1696-3 | TDM-1-1-6-2 | TDM | 1 | 1 | -1 | 6 | 2 |
| 307 | PSC1696-3 | TDM-1-1-6-3 | TDM | 1 | 1 | -1 | 6 | 3 |
| 308 | PSC1696-3 | TDM-1-1-6-4 | TDM | 1 | 1 | -1 | 6 | 4 |
| 309 | PSC1696-3 | TDM-1-1-8 | TDM | 1 | 1 | -1 | 8 | -1 |
| 310 | PSC1696-3 | TDM-1-1-8-1 | TDM | 1 | 1 | -1 | 8 | 1 |
| 311 | PSC1696-3 | TDM-1-1-8-2 | TDM | 1 | 1 | -1 | 8 | 2 |
| 312 | PSC1696-3 | TDM-1-1-8-3 | TDM | 1 | 1 | -1 | 8 | 3 |
| 313 | PSC1696-3 | TDM-1-1-8-4 | TDM | 1 | 1 | -1 | 8 | 4 |
| 314 | PSC1696-3 | MCC-1-1-10 | MCC | 1 | 1 | -1 | 10 | -1 |
| 315 | PSC1696-3 | MCC-1-1-11 | MCC | 1 | 1 | -1 | 11 | -1 |
| 316 | PSC1696-3 | OAC-1-1-12 | OAC | 1 | 1 | -1 | 12 | -1 |
| 317 | PSC1696-3 | OSMC-1-1-13 | OSMC | 1 | 1 | -1 | 13 | -1 |
| 318 | PSC1696-3 | TDM-1-1-14 | TDM | 1 | 1 | -1 | 14 | -1 |
| 319 | PSC1696-3 | TDM-1-1-14-1 | TDM | 1 | 1 | -1 | 14 | 1 |
| 320 | PSC1696-3 | TDM-1-1-14-2 | TDM | 1 | 1 | -1 | 14 | 2 |
| 321 | PSC1696-3 | TDM-1-1-14-3 | TDM | 1 | 1 | -1 | 14 | 3 |
| 322 | PSC1696-3 | TDM-1-1-14-4 | TDM | 1 | 1 | -1 | 14 | 4 |
| 323 | PSC1696-3 | TDM-1-1-14-5 | TDM | 1 | 1 | -1 | 14 | 5 |

*FIG. 6A cont. (1)*

| BOARDTYPE | FREQ | ITUFREQ | SIGTYPE | MATEID | SPV |
|---|---|---|---|---|---|
| OMDX_XS | | 193000-193100-193200-193300-193500-193600-193700-193800 | | OAC-1-1-12 | NO |
| MCC2 | 30 | 193000 | SONET | OMD-1-1-3 | |
| MCC3 | 35 | 193500 | SONET | | |
| | | | | | |
| SHORTH | | | | MCC-1-1-4 | |
| | | | | | |
| HF1310 | | | GE | | |
| SONET | | | OC3 | | |
| SHORTH | | | | MCC-1-1-17 | |
| | | | | | |
| HF1310 | | | GE | | |
| SONET | | | OC3 | | |
| MCC2 | 58 | 195800 | SONET | OMD-1-4-3 | |
| MCC2 | 37 | 193700 | SONET | OMD-1-1-22 | |
| OAC2 | | | | | 1 |
| TDM_SFP | | | | | |
| | | | | | |
| | | | | | |
| DWDM | 21 | 192100 | | OMD-1-3-3 | |

| | | | | | | | |
|---|---|---|---|---|---|---|---|
| 324 | PSC1696-3 | EMPTY_SLOT-1-1-16 | EMPTY_SLOT | 1 | 1 | | |
| 325 | PSC1696-3 | MCC-1-1-17 | MCC | 1 | 1 | 16 | -1 |
| 326 | PSC1696-3 | MCC-1-1-18 | MCC | 1 | 1 | 17 | -1 |
| 327 | PSC1696-3 | MCC-1-1-19 | MCC | 1 | 1 | 18 | -1 |
| 328 | PSC1696-3 | EMPTY_SLOT-1-1-20 | EMPTY_SLOT | 1 | 1 | 19 | -1 |
| 329 | PSC1696-3 | EMPTY_SLOT-1-1-21 | EMPTY_SLOT | 1 | 1 | 20 | -1 |
| 330 | PSC1696-3 | OMD-1-1-22 | OMD | 1 | 1 | 21 | -1 |
| 331 | PSC1696-3 | SPVM-1-1-23 | SPVM | 1 | 1 | 22 | -1 |
| 332 | PSC1696-3 | EMPTY_SLOT-1-1-24 | EMPTY_SLOT | 1 | 1 | 23 | -1 |
| 333 | PSC1696-3 | PSC-1-1-25 | PSC | 1 | 1 | 24 | -1 |
| 334 | PSC1696-3 | ELAN-1-1-26 | ELAN | 1 | 1 | 25 | -1 |
| 335 | PSC1696-3 | ILAN-1-1-27 | ILAN | 1 | 1 | 26 | -1 |
| 336 | PSC1696-3 | EMPTY_SLOT-1-1-28 | EMPTY_SLOT | 1 | 1 | 27 | -1 |
| 337 | PSC1696-3 | EMPTY_SLOT-1-1-29 | EMPTY_SLOT | 1 | 1 | 28 | -1 |
| 338 | PSC1696-3 | OPC-1-1-30 | OPC | 1 | 1 | 29 | -1 |
| 339 | PSC1696-3 | OPC-1-1-31 | OPC | 1 | 1 | 30 | -1 |
| 340 | PSC1696-3 | OPC-1-1-32 | OPC | 1 | 1 | 31 | -1 |
| 341 | PSC1696-3 | OPC-1-1-33 | OPC | 1 | 1 | 32 | -1 |
| 342 | PSC1696-3 | OPC-1-1-34 | OPC | 1 | 1 | 33 | -1 |
| 343 | PSC1696-3 | EMPTY_SLOT-1-1-35 | EMPTY_SLOT | 1 | 1 | 34 | -1 |
| 344 | PSC1696-3 | HK-1-1-36 | HK | 1 | 1 | 35 | -1 |
| 345 | PSC1696-3 | EQUIPPED_SLOT-1-1-37 | EQUIPPED_SLOT | 1 | 1 | 36 | -1 |
| 346 | PSC1696-3 | EMPTY_SLOT-1-1-38 | EMPTY_SLOT | 1 | 1 | 37 | -1 |
| 347 | PSC1696-3 | EMPTY_SLOT-1-1-39 | EMPTY_SLOT | 1 | 1 | 38 | -1 |
| 348 | PSC1696-3 | EMPTY_SLOT-1-1-40 | EMPTY_SLOT | 1 | 1 | 39 | -1 |
| 349 | PSC1696-3 | EMPTY_SLOT-1-1-41 | EMPTY_SLOT | 1 | 1 | 40 | -1 |
| 350 | PSC1696-3 | OPC-1-1-42 | OPC | 1 | 1 | 41 | -1 |
| | | | | | | 42 | -1 |

FIG. 6A cont. (3)

| | | | | | | |
|---|---|---|---|---|---|---|
| MCC2 | 33 | 193300 | | SONET | OMD-1-1-22 | |
| MCC2 | 36 | 193600 | | SONET | OMD-1-1-3 | |
| MCC2 | 36 | 193600 | | SONET | OMD-1-1-22 | 2 |
| OMDX_XS | 30 | | 193000-193100-193200-193300-193500-193600-193700-193800 | | | |
| SPVM2 | | | | | | |

FIG. 6A cont. (4)

| | | | | | | | |
|---|---|---|---|---|---|---|---|
| 351 | PSC1696-3 | EMPTY_SLOT-1-1-43 | EMPTY_SLOT | 1 | 1 | -1 | 43 | -1 |
| 352 | PSC1696-3 | EMPTY_SLOT-1-1-44 | EMPTY_SLOT | 1 | 1 | -1 | 44 | -1 |
| 353 | PSC1696-3 | EMPTY_SLOT-1-1-45 | EMPTY_SLOT | 1 | 1 | -1 | 45 | -1 |
| 354 | PSC1696-3 | PSC-1-1-48 | PSC | 1 | 1 | -1 | 48 | -1 |
| 355 | PSC1696-3 | FAN-1-1-49 | FAN | 1 | 1 | -1 | 49 | -1 |
| 356 | PSC1696-3 | SC-1-2-1 | SC | 1 | 2 | -1 | 1 | -1 |
| 357 | PSC1696-3 | EMPTY_SLOT-1-2-2 | EMPTY_SLOT | 1 | 2 | -1 | 2 | -1 |
| 358 | PSC1696-3 | OMD-1-2-3 | OMD | 1 | 2 | -1 | 3 | -1 |
| 359 | PSC1696-3 | EMPTY_SLOT-1-2-4 | EMPTY_SLOT | 1 | 2 | -1 | 4 | -1 |
| 360 | PSC1696-3 | MCC-1-2-5 | MCC | 1 | 2 | -1 | 5 | -1 |
| 361 | PSC1696-3 | MCC-1-2-6 | MCC | 1 | 2 | -1 | 6 | -1 |
| 362 | PSC1696-3 | EMPTY_SLOT-1-2-7 | EMPTY_SLOT | 1 | 2 | -1 | 7 | -1 |
| 363 | PSC1696-3 | EQUIPPED_SLOT-1-2-8 | EQUIPPED_SLOT | 1 | 2 | -1 | 8 | -1 |
| 364 | PSC1696-3 | EMPTY_SLOT-1-2-9 | EMPTY_SLOT | 1 | 2 | -1 | 9 | -1 |
| 365 | PSC1696-3 | OCC-1-2-9-1 | OCC | 1 | 2 | -1 | 9 | 1 |
| 366 | PSC1696-3 | EMPTY_SLOT-1-2-10 | EMPTY_SLOT | 1 | 2 | -1 | 10 | -1 |
| 367 | PSC1696-3 | 2XGE-1-2-11 | 2XGE | 1 | 2 | -1 | 11 | 1 |
| 368 | PSC1696-3 | 2XGE-1-2-11-1 | 2XGE | 1 | 2 | -1 | 11 | 2 |
| 369 | PSC1696-3 | 2XGE-1-2-11-2 | 2XGE | 1 | 2 | -1 | 11 | 6 |
| 370 | PSC1696-3 | 2XGE-1-2-11-6 | 2XGE | 1 | 2 | -1 | 11 | -1 |
| 371 | PSC1696-3 | EMPTY_SLOT-1-2-12 | EMPTY_SLOT | 1 | 2 | -1 | 12 | -1 |
| 372 | PSC1696-3 | SPVF-1-2-13 | SPVF | 1 | 2 | -1 | 13 | -1 |
| 373 | PSC1696-3 | EMPTY_SLOT-1-2-14 | EMPTY_SLOT | 1 | 2 | -1 | 14 | -1 |
| 374 | PSC1696-3 | EMPTY_SLOT-1-2-15 | EMPTY_SLOT | 1 | 2 | -1 | 15 | -1 |
| 375 | PSC1696-3 | MVAC-1-2-16 | MVAC | 1 | 2 | -1 | 16 | -1 |
| 376 | PSC1696-3 | EMPTY_SLOT-1-2-17 | EMPTY_SLOT | 1 | 2 | -1 | 17 | -1 |

NETWORK VIEW / NE FIBERING VIEW / EQUIPMENT VIEW / CARDS / PORTS / FACILITIES / CROSSCONNECTS

FIG. 6A cont. (5)

| | | | | | | | |
|---|---|---|---|---|---|---|---|
| OMDX | 42 | 194200-194300-194400-194500-194700-194800-194900-195000 | | OMD-1-1-3 | NO | | |
| MCC2 | 43 | 194300 | SONET | OMD-1-2-3 | | | |
| MCC2 | 45 | 194500 | SONET | OMD-1-2-22 | | | |
| | | | | | | | |
| FC | | | | | | | |
| GBELX | | | | | | | |
| DWDM | 27 | 192700 | | OMD-1-3-3 | | | |
| SPVF_2W | | | | | | | |
| INVENTORY | | | | | ▼ | | |

FIG. 6B

| | TID | AID | SIGNALRATE | EQUIPMENTAID | RACKNUM | SHELFNUM | SUBSHELFNUM |
|---|---|---|---|---|---|---|---|
| 52 | PSC1696-3 | OGS-1-1-4-1 | OGS | MCC-1-1-4 | 1 | 1 | -1 |
| 53 | PSC1696-3 | OGS-1-1-5-1 | OGS | MCC-1-1-5-1 | 1 | 1 | -1 |
| 54 | PSC1696-3 | OGS-1-1-5-2 | OGS | MCC-1-1-5 | 1 | 1 | -1 |
| 55 | PSC1696-3 | OC48-1-1-6-1 | OC48_DSR | TDM-1-1-6-1 | 1 | 1 | -1 |
| 56 | PSC1696-3 | OGS-1-1-6-3-1 | OGS | TDM-1-1-6-3 | 1 | 1 | -1 |
| 57 | PSC1696-3 | OGS-1-1-6-4-1 | OGS | TDM-1-1-6-4 | 1 | 1 | -1 |
| 58 | PSC1696-3 | OC48-1-1-8-1 | OC48_DSR | TDM-1-1-8-1 | 1 | 1 | -1 |
| 59 | PSC1696-3 | OGS-1-1-8-3-1 | OGS | TDM-1-1-8-3 | 1 | 1 | -1 |
| 60 | PSC1696-3 | OGS-1-1-8-4-1 | OGS | TDM-1-1-8-4 | 1 | 1 | -1 |
| 61 | PSC1696-3 | OGS-1-1-10-1 | OGS | MCC-1-1-10 | 1 | 1 | -1 |
| 62 | PSC1696-3 | OGS-1-1-11-1 | OGS | MCC-1-1-11 | 1 | 1 | -1 |
| 63 | PSC1696-3 | OTS-1-1-12-1 | OTS | OAC-1-1-12 | 1 | 1 | -1 |
| 64 | PSC1696-3 | OC48-1-1-14-1 | OC48_DSR | TDM-1-1-14-1 | 1 | 1 | -1 |
| 65 | PSC1696-3 | OGS-1-1-17-1 | OGS | MCC-1-1-17 | 1 | 1 | -1 |
| 66 | PSC1696-3 | OGS-1-1-18-1 | OGS | MCC-1-1-18 | 1 | 1 | -1 |
| 67 | PSC1696-3 | OGS-1-1-19-1 | OGS | MCC-1-1-19 | 1 | 1 | -1 |
| 68 | PSC1696-3 | OTS-1-1-22-1 | OTS | OMD-1-1-22 | 1 | 1 | -1 |
| 69 | PSC1696-3 | OSC-1-1-23-1 | UNSPECIFIED | SPVM-1-1-23 | 1 | 1 | -1 |
| 70 | PSC1696-3 | OSC-1-1-23-2 | UNSPECIFIED | SPVM-1-1-23 | 1 | 1 | -1 |
| 71 | PSC1696-3 | OGS-1-2-5-1 | OGS | MCC-1-2-5 | 1 | 2 | -1 |
| 72 | PSC1696-3 | OGS-1-2-6-1 | OGS | MCC-1-2-6 | 1 | 2 | -1 |

FIG. 6B cont. (1)

| SLOTNUM 635 | PORTNUM 660 | PST | SST | SIGTYPE | RATE | SUPPBRD 665 |
|---|---|---|---|---|---|---|
| 4 | 1 | IS | | SONET | 48 | |
| 5 | 1 | OOS-AU | | | | |
| 5 | 2 | IS | | | | |
| 6 | 1 | OOS-AU | | | | |
| 6 | 3 | IS | | GE | 1250.000 | |
| 6 | 4 | OOS-AU | | SONET | 3 | |
| 8 | 1 | OOS-AU | | | | |
| 8 | 3 | OOS-AU | | GE | 1250.000 | |
| 8 | 4 | OOS-AU | | SONET | 3 | |
| 10 | 1 | IS | | SONET | 48 | |
| 11 | 1 | IS | | SONET | 48 | |
| 12 | 1 | IS | | | | OAC-1-1-12 |
| 14 | 1 | OOS-AU | | | | |
| 17 | 1 | OOS-AU | | SONET | 48 | |
| 18 | 1 | IS | | SONET | 3 | |
| 19 | 1 | IS | | SONET | 3 | |
| 22 | 1 | IS | | | | OMD-1-1-22 |
| 23 | 1 | IS | | | | |
| 23 | 2 | IS | | | | |
| 5 | 1 | IS | | SONET | 12 | |
| 6 | 1 | IS | | SONET | 3 | |

FIG. 6B cont. (2)

| | | | | | | | |
|---|---|---|---|---|---|---|---|
| 73 | PSC1696-3 | OGS-1-2-11-1-1 | OGS | 2XGE-1-2-11-1 | 1 | 2 | 1 |
| 74 | PSC1696-3 | OGS-1-2-11-2 | OGS | 2XGE-1-2-11-2 | 1 | 2 | 1 |
| 75 | PSC1696-3 | OGS-1-2-11-2-1 | OGS | 2XGE-1-2-11-2 | 1 | 2 | 1 |
| 76 | PSC1696-3 | OGS-1-2-18-1 | OGS | MCC-1-2-18-1 | 1 | 2 | 1 |
| 77 | PSC1696-3 | OGS-1-2-19-1 | OGS | MCC-1-2-19 | 1 | 2 | 1 |
| 78 | PSC1696-3 | OGS-1-2-21-1 | OGS | MCC-1-2-21 | 1 | 2 | 1 |
| 79 | PSC1696-3 | OGS-1-3-11-1 | OGS | WLA-1-3-11-1 | 1 | 3 | 1 |
| 80 | PSC1696-3 | OGS-1-3-11-2 | OGS | WLA-1-3-11-2 | 1 | 3 | 1 |
| 81 | PSC1696-3 | OGS-1-3-11-3 | OGS | WLA-1-3-11-3 | 1 | 3 | 1 |
| 82 | PSC1696-3 | OGS-1-3-11-4 | OGS | WLA-1-3-11-4 | 1 | 3 | 1 |
| 83 | PSC1696-3 | OGS-1-3-21-1 | OGS | OCC-1-3-21-1 | 1 | 3 | 1 |
| 84 | PSC1696-3 | OC48-1-4-4-1 | OC48_DSR | TDM-1-4-4-1 | 1 | 4 | 1 |
| 85 | PSC1696-3 | OGS-1-4-4-3-1 | OGS | TDM-1-4-4-3 | 1 | 4 | 1 |
| 86 | PSC1696-3 | OGS-1-4-4-4-1 | OGS | TDM-1-4-4-4 | 1 | 4 | 1 |
| 87 | PSC1696-3 | OC48-1-4-6-1 | OC48_DSR | TDM-1-4-6-1 | 1 | 4 | 1 |
| 88 | PSC1696-3 | OGS-1-4-6-1-1 | OGS | TDM-1-4-6-1 | 1 | 4 | 1 |
| 89 | PSC1696-3 | OGS-1-4-6-4-1 | OGS | TDM-1-4-6-4 | 1 | 4 | 1 |
| 90 | PSC1696-3 | OC48-1-4-8-1 | OC48_DSR | TDM-1-4-8-1 | 1 | 4 | |
| 91 | PSC1696-3 | OGS-1-4-8-1-1 | OGS | TDM-1-4-8-1 | 1 | 4 | 1 |
| 92 | PSC1696-3 | OGS-1-4-8-4-1 | OGS | TDM-1-4-8-4 | 1 | 4 | 1 |
| 93 | PSC1696-3 | OGS-1-4-20-1 | OGS | MCC-1-4-20-1 | 1 | 4 | 1 |
| 94 | PSC1696-3 | OGS-1-4-20-2 | OGS | MCC-1-4-20 | 1 | 4 | 1 |

FIG. 6B cont. (3)

| | | | | |
|---|---|---|---|---|
| 11 | 1 | | | |
| 11 | 2 | IS | | 2488.320 |
| 11 | 2 | IS | | 1250.000 |
| 18 | 1 | OOS-AU | SONET | 48 |
| 19 | 1 | IS | SONET | 48 |
| 21 | 1 | OOS-AU | SONET | 48 |
| 11 | 1 | IS | | 2488.320 |
| 11 | 2 | OOS-AU | | 2488.320 |
| 11 | 3 | | | |
| 11 | 4 | | | |
| 21 | 1 | OOS-AU | SONET | 192 |
| 4 | 1 | OOS-AU | | |
| 4 | 3 | OOS-AU | FE | 100.000 |
| 4 | 4 | OOS-AU | FE | 100.000 |
| 6 | 1 | OOS-AU | | |
| 6 | 1 | OOS-AU | FE | 100.000 |
| 6 | 4 | OOS-AU | FE | 100.000 |
| 8 | 1 | OOS-AU | | |
| 8 | 1 | OOS-AU | FE | 100.000 |
| 8 | 4 | OOS-AU | FE | 100.000 |
| 20 | 1 | | | |
| 20 | 2 | OOS-AU | | |

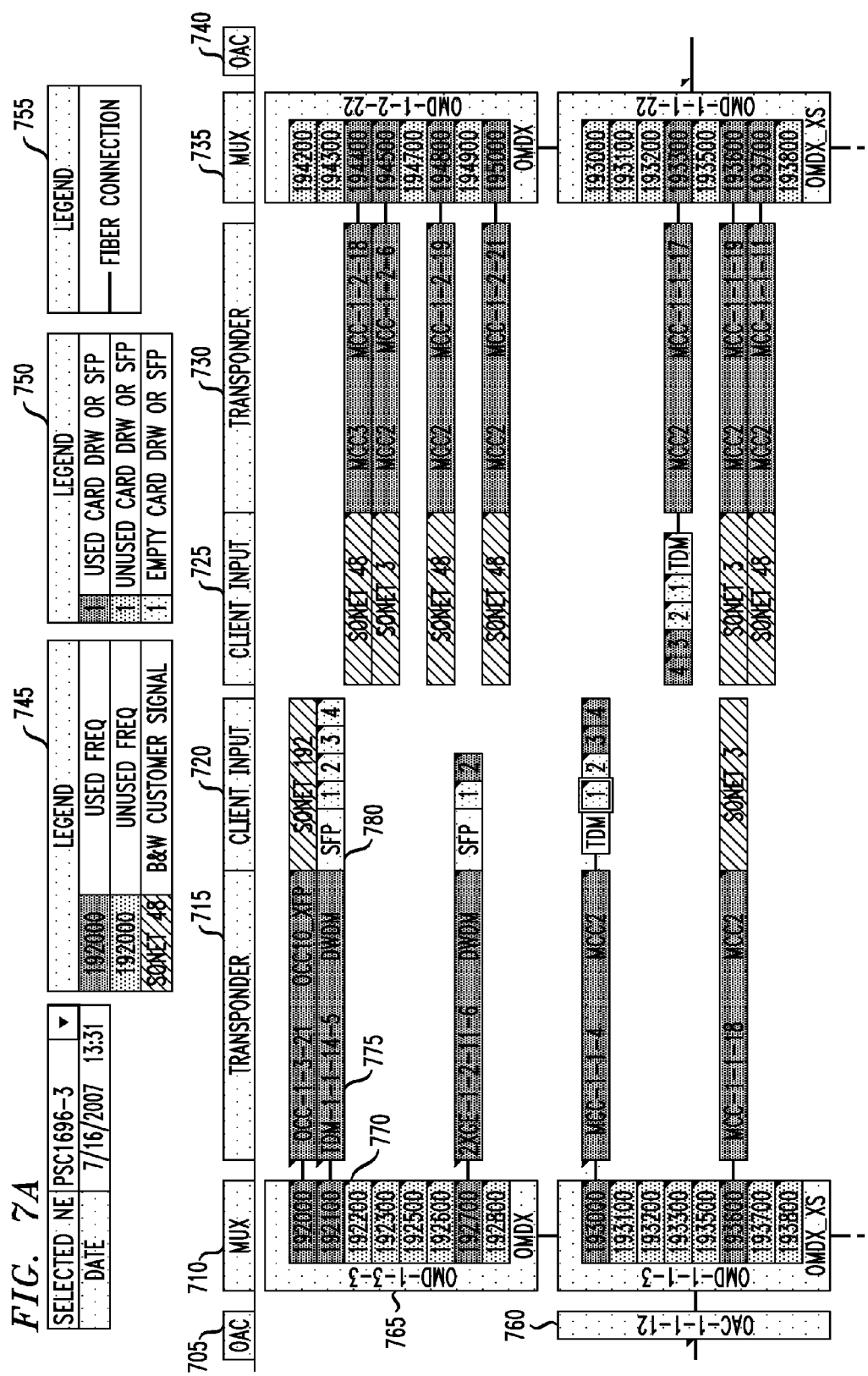

SYSTEM AND METHOD FOR GENERATING A VISUAL REPRESENTATION OF A WAVELENGTH DIVISION MULTIPLEXING OPTICAL NETWORK AND NODES THEREOF

TECHNICAL FIELD OF THE INVENTION

The invention is directed, in general, to network management and, more specifically, to a system and method for generating a visual representation of a wavelength division multiplexing (WDM) optical network and nodes thereof.

BACKGROUND OF THE INVENTION

Optical networks form the backbone of today's telecommunication and data network infrastructure. Optical networks are formed by interconnecting nodes (referred to herein as network elements, or NE) with optical fiber segments. Coherent (laser) light transmits information among the nodes and along the segments. The first optical networks used a single wavelength of light to convey information among its nodes. More modern optical networks employ wavelength division multiplexing (WDM), in which multiple wavelengths of light form separate channels through the fibers, allowing the same optical fibers to support significantly greater data rates. Dense WDM, or DWDM, packs the multiple wavelengths less than 100 GHz apart and as a result provides data rates that exceed those of WDM (now called coarse WDM, or CWDM).

Resources are located at the nodes (NEs) or along the segments of an optical network. These resources process the light in various ways. Resources are defined as provisionable entities (e.g., equipment, ports, facilities, crossconnects and protection groups). Resources include, for example, passive elements such as optical multiplexers/demultiplexers (called "OMDs" or, more colloquially, "muxes") that combine or separate different wavelengths of light, and active elements, such as amplifiers that amplify optical signals, transponders that convert light from one wavelength to another and are typically used to add specific wavelengths to or drop specific wavelengths from a segment of the optical network, time-domain multiplexers/demultiplexers that combine or separate optical signals based on time, transmitters that convert electrical signals to optical form and receivers that convert optical signals back into electrical signals.

From a physical perspective, resources located at a node take the form of cards that are mounted in slots of chasses called shelves and sub-cards that may be mounted in portions of the cards called drawers. The shelves themselves may be divided into sub-shelves. The shelves are mounted on vertical racks. Depending upon its complexity, a node often has more than one shelf and, indeed, may have more than one rack.

The shelves have backplane connectors that provide power and various electrical signals to the back edges of the cards or sub-cards. Optical connections to the cards or sub-cards, called ports, are provided on the front edges thereof to receive optical fibers. Some cards or sub-cards have only one port; others have many, depending on the function performed. As a result, a typical rack may have hundreds of optical fibers protruding from and running along its front. Depending upon the fastidiousness of the person who installed the node, the fibers may be bundled neatly together with ties or resemble spaghetti.

Optical networks must adapt to changing needs. For example, it may become necessary to add a new wavelength one node to another or to reroute an existing wavelength. A visual representation, or visualization, of the optical network is important to understand how the network is currently configured, how the change may best be made, and particularly whether or not the change will require any resource(s) to be relocated or purchased. A visual representation is a picture that places the resources of the various nodes of an optical network into a logical and understandable form such that it may be understood and managed more effectively.

A person creates a visual representation first by drawing schematic symbols representing the resource, grouped by node. Then a person standing in front of each rack of the optical network determines how the resources are interconnected by tracing the optical fibers at each node from one resource to another. These interconnections are then reflected in the visual representation. Finally, a person having intimate knowledge of the capabilities and constraints of each resource (embodied in what are called "engineering rules") determines how best to make the change and what additional resource(s) may be needed to effect the change.

Creating a visual representation of even a modest optical network requires significant time and effort and, due to the amount of information required to be synthesized, may be incomplete and contain errors. Creating a visual representation of a complex network proves to be a formidable task. Updating visual representations as changes are made further complicates the process and presents recurring opportunities for errors to arise. Nonetheless, since visual representations are so useful, they continue to be created and routinely updated to support optical network management and growth.

SUMMARY OF THE INVENTION

To address the above-discussed deficiencies of the prior art, one aspect of the invention provides a system for generating a visual representation of a WDM optical network and nodes thereof. In one embodiment, the system includes: (1) a connectivity, pass-through and error identifier configured to identify connectivity and any pass-throughs and termination errors with respect to at least some nodes of the WDM optical network and (2) a connectivity, pass-through and error displayer coupled to the connectivity, pass-through and error identifier and configured to generate the visual representation that indicates the connectivity and the any pass-throughs and termination errors.

In another aspect, the invention provides a computer-implemented method of generating a visual representation of a WDM optical network. In one embodiment, the method includes: (1) identifying connectivity and any pass-throughs and termination errors with respect to at least some nodes of the WDM optical network and (2) generating the visual representation that indicates the connectivity and the any pass-throughs and termination errors.

In yet another aspect, the invention provides a system for generating a visual representation of a node in a WDM optical network. In one embodiment, the system includes: (1) a resource analyzer and engineering rule applier configured to identify resources resident at the node, store information regarding the resources in a database, sort the resources according to hierarchical level, recursively associate the resources by hierarchical level, store the resource relationships that result from the recursive association as attributes in the database and apply engineering rules to the attributes and (2) a visual representation displayer coupled to the resource analyzer and engineering rule applier and configured to extract information from the database to generate the visual representation of the node.

In still another aspect, the invention provides a method of generating a visual representation of a node in a WDM optical network. In one embodiment, the method includes: (1) identifying resources resident at the node, (2) storing information regarding the resources in a database, (3) sorting the resources according to hierarchical level, (4) recursively associating the resources by hierarchical level, (5) storing the resource relationships that result from the recursively associating as attributes in the database and (6) applying engineering rules to the attributes.

The foregoing has outlined certain aspects and embodiments of the invention so that those skilled in the pertinent art may better understand the detailed description of the invention that follows. Additional aspects and embodiments will be described hereinafter that form the subject of the claims of the invention. Those skilled in the pertinent art should appreciate that they can readily use the disclosed aspects and embodiments as a basis for designing or modifying other structures for carrying out the same purposes of the invention. Those skilled in the pertinent art should also realize that such equivalent constructions do not depart from the scope of the invention.

BRIEF DESCRIPTION OF THE DRAWINGS

For a more complete understanding of the invention, reference is now made to the following descriptions taken in conjunction with the accompanying drawings, in which:

FIGS. 2B-2E illustrate more detailed flow diagrams of first, second, third and fourth steps of the method of FIG. 2A;

FIGS. 6A-B respectively illustrate embodiments of equipment and port datasheets generated during a first phase of the method of FIG. 5.

DETAILED DESCRIPTION

Figure 1:
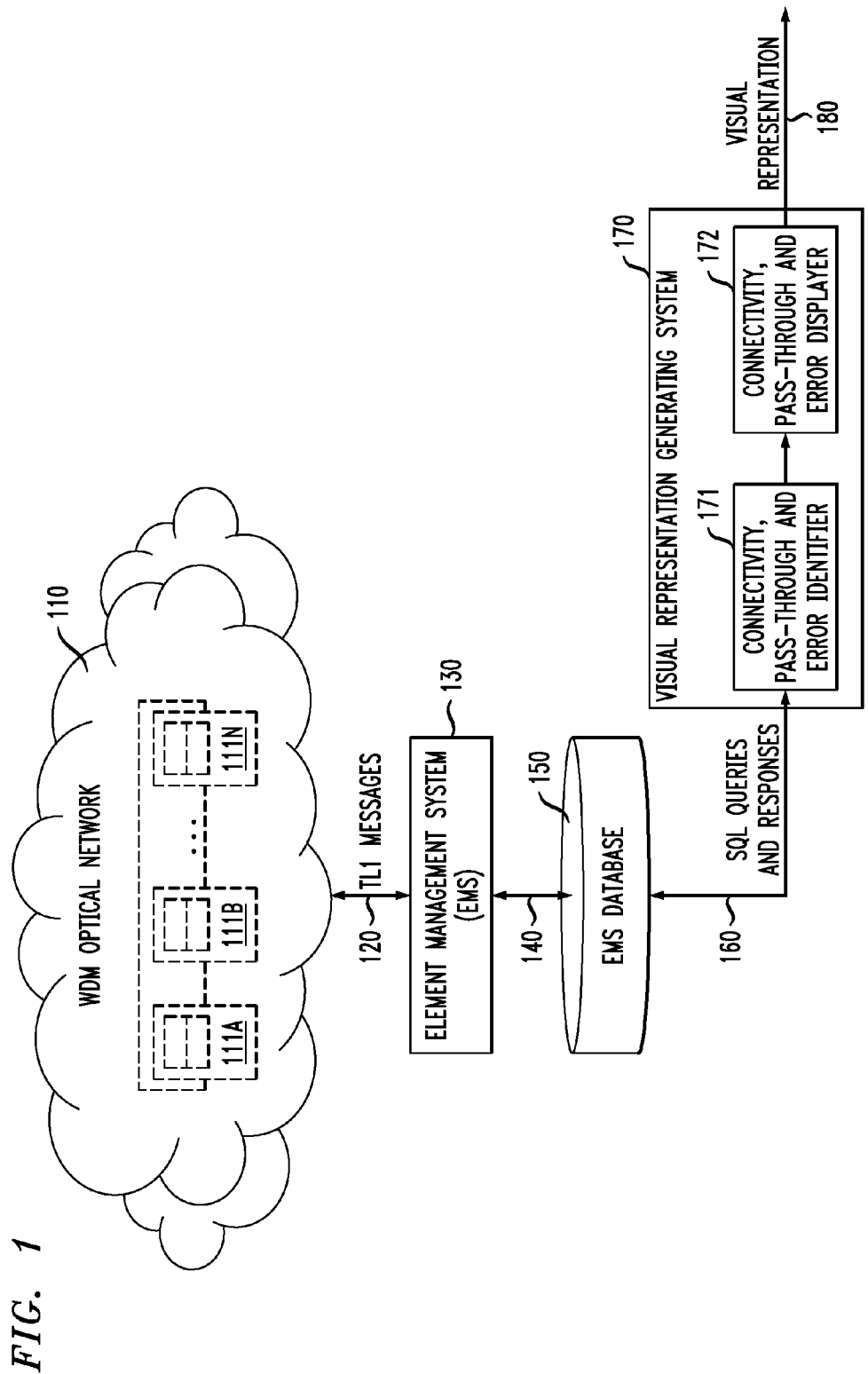
FIG. 1 illustrates a block diagram of one embodiment of a system for generating a visual representation of a WDM optical network constructed according to the principles of the invention.

FIG. 1 illustrates a block diagram of one embodiment of a visual representation generating system, generally designated 170, for generating a visual representation constructed according to the principles of the invention. The visual representation generating system 170 is configured to generate a visual representation 180 of a WDM optical network 110 containing at least two nodes (e.g., 111A, 111B, ..., 111N, represented in broken-line) and at least one segment (not referenced, but also represented in broken-line) coupling the nodes together. Each of the nodes (e.g., 111A, 111B, ..., 111N) contains various resources (not referenced, but represented in broken-line). The resources are interconnected in a nontrivial way such that a complete, accurate visual representation of the WDM optical network 110 would be highly advantageous. The WDM optical network 110 may be of any WDM (e.g., CWDM or DWDM) type. However, the WDM optical network 110 of FIG. 1 is a ring-configured DWDM optical network.

Those skilled in the pertinent art are familiar with conventional optical network management systems (NMSs) or element management systems (EMSs). For purposes of the present discussion, those two terms will be regarded as synonymous. Those skilled in the pertinent art understand that an EMS issues command messages to, and receives responsive information messages from, the resources (equipment, ports, facilities, crossconnects, protection groups, etc.) of an optical network to manage it. The messages conform to a standard protocol which, in the specific environment of FIG. 1, is Transaction Language 1, or simply TL1. The invention is not limited to a particular protocol, however. Accordingly, FIG. 1 schematically illustrates TL1 messages 120 being communicated between the WDM optical network 110 and an EMS 130. Table 1, below, sets forth sample TL1 messages communicated between an EMS and resources in which the EMS sends TL1 RTRV-EQPT (retrieve equipment) command messages to the resources, and the resources respond with information messages regarding themselves.

TABLE 1

Sample TL1 Messages Communicated Between an EMS and
Resources to Retrieve Information Regarding the Resources 2007-07-13 11:03:29,794 : Sending TL1 command (user unknown):
RTRV-EQPT:PSC1696-3:ALL:H23164;
2007-07-13 11:03:41,457 : Received TL1 message:
M H23164 COMPLD
  "SHELF-1-1::SHELFTYPE=MASTERSTD:IS"
  "EC-1-1-1:::IS"
  "OMD-1-1-3::BOARDTYPE=OMDX_XS,MATEID=OAC-1-1-
12,FREQ=30,SPV=NO,ITUFREQ=193000-193100-193200-193300-193500-
193600-193700-193800:IS"
    "MCC-1-1-4::BOARDTYPE=MCC2,MATEID=OMD-1-1-
3,FREQ=30,SIGTYPE=SONET,ITUFREQ=193000,ATTNFCT=18:IS"
    "MCC-1-1-
5::BOARDTYPE=MCC3,FREQ=35,SIGTYPE=SONET,ITUFREQ=193500,ATTNFCT=20:OOS-
AU,UEQ"
    "TDM-1-1-6::BOARDTYPE=SHORTH,MATEID=MCC-1-1-4:IS"
    "TDM-1-1-6-3::BOARDTYPE=HF1310,SIGTYPE=GE:IS"
    "TDM-1-1-6-4::BOARDTYPE=SONET,SIGTYPE=OC3:IS"

TABLE 1-continued

Sample TL1 Messages Communicated Between an EMS and
Resources to Retrieve Information Regarding the Resources "TDM-1-1-8::BOARDTYPE=SHORTH,MATEID=MCC-1-1-17:IS"
"TDM-1-1-8-3::BOARDTYPE=HF1310,SIGTYPE=GE:IS"
"TDM-1-1-8-4::BOARDTYPE=SONET,SIGTYPE=OC3:IS"
"MCC-1-1-10::BOARDTYPE=MCC2,MATEID=OMD-1-4-
3,FREQ=58,SIGTYPE=SONET,ITUFREQ=195800,ATTNFCT=15:IS"
"MCC-1-1-11::BOARDTYPE=MCC2,MATEID=OMD-1-1-
22,FREQ=37,SIGTYPE=SONET,ITUFREQ=193700,ATTNFCT=0:IS"
"OAC-1-1-
12::BOARDTYPE=OAC2,SPV=1,ATTNFCT=1,EOL=14,INSATTN=15,NBRWVL=10,OPWRL1=5,
OPWRL2=17,ATTNFCTCOMP=1,OPWRT=MAN,VOAT=MAN:IS"
"OSMC-1-1-
13::CALNFCT1=24,CALNFCT2=20,CALNFCT3=20,CALNFCT4=32.5,CALNFCT5=17,
CALNFCT6=24.5,CALNFCT7=20,CALNFCT8=20:IS"
"TDM-1-1-14::BOARDTYPE=TDM_SFP:OOS-AU,UEQ"
"TDM-1-1-14-5::BOARDTYPE=DWDM,MATEID=OMD-1-3-
3,FREQ=21,ITUFREQ=192100:OOS-AU,UEQ"
"MCC-1-1-17::BOARDTYPE=MCC2,MATEID=OMD-1-1-
22,FREQ=33,SIGTYPE=SONET,ITUFREQ=193300,ATTNFCT=4:OOS-MA"
"MCC-1-1-18::BOARDTYPE=MCC2,MATEID=OMD-1-1-
3,FREQ=36,SIGTYPE=SONET,ITUFREQ=193600,ATTNFCT=19:IS"
"MCC-1-1-19::BOARDTYPE=MCC2,MATEID=OMD-1-1-
22,FREQ=36,SIGTYPE=SONET,ITUFREQ=193600,ATTNFCT=2:IS"
"OMD-1-1-22::BOARDTYPE=OMDX_XS,FREQ=30,SPV=2,ITUFREQ=193000-
193100-193200-193300-193500-193600-193700-193800:IS"
"SPVM-1-1-23::BOARDTYPE=SPVM2,CLOCK=LCL:IS"
"PSC-1-1-25:::IS"
"ELAN-1-1-26:::IS"
"ILAN-1-1-27:::IS"
"OPC-1-1-30:::OOS-AU,UEQ"
"OPC-1-1-31:::OOS-AU,UEQ"
"OPC-1-1-32:::OOS-AU,UEQ"
"OPC-1-1-33:::OOS-AU,UEQ"
"OPC-1-1-34:::OOS-AU,UEQ"
"HK-1-1-36:::IS"
"RAI-1-1-37:::IS"
"OPC-1-1-42:::IS"
"PSC-1-1-48:::IS"
"FAN-1-1-49:::IS"
"SHELF-1-2::SHELFTYPE=EXPANSION:IS"
"SC-1-2-1:::IS"
"OMD-1-2-3::BOARDTYPE=OMDX,MATEID=OMD-1-1-
3,FREQ=42,SPV=NO,ITUFREQ=194200-194300-194400-194500-194700-
194800-194900-195000:IS"
"MCC-1-2-5::BOARDTYPE=MCC2,MATEID=OMD-1-2-
3,FREQ=43,SIGTYPE=SONET,ITUFREQ=194300,ATTNFCT=17:IS"
"MCC-1-2-6::BOARDTYPE=MCC2,MATEID=OMD-1-2-
22,FREQ=45,SIGTYPE=SONET,ITUFREQ=194500,ATTNFCT=20:IS"
"2XGE-1-2-11::BOARDTYPE=FC:IS"
"2XGE-1-2-11-2::BOARDTYPE=GBELX:OOS-AU"
"2XGE-1-2-11-6::BOARDTYPE=DWDM,MATEID=OMD-1-3-
3,FREQ=27,ITUFREQ=192700:IS"
"SPVF-1-2-13::BOARDTYPE=SPVF_2W:OOS-AU,UEQ"
"TDM-1-2-14::BOARDTYPE=TDM_SFP:OOS-AU,UEQ"
"TDM-1-2-14-5::BOARDTYPE=DWDM,MATEID=OMD-1-3-
3,FREQ=22,ITUFREQ=192200:OOS-AU,UEQ"
"MVAC-1-2-16::ATTNFCT=10,ATTNFCT2=20:OOS-AU"
"2XGE-1-2-17::BOARDTYPE=FC:OOS-AU,UEQ"
"MCC-1-2-18::BOARDTYPE=MCC3,MATEID=OMD-1-2-
22,FREQ=44,SIGTYPE=SONET,ITUFREQ=194400,ATTNFCT=3:IS"
"MCC-1-2-18-1::BOARDTYPE=S161:IS"
"MCC-1-2-19::BOARDTYPE=MCC2,MATEID=OMD-1-2-
22,FREQ=48,SIGTYPE=SONET,ITUFREQ=194800,ATTNFCT=7:IS"
"MCC-1-2-21::BOARDTYPE=MCC2,MATEID=OMD-1-2-
22,FREQ=50,SIGTYPE=SONET,ITUFREQ=195000,ATTNFCT=4:IS"
"OMD-1-2-22::BOARDTYPE=OMDX,MATEID=OMD-1-1-
22,FREQ=42,SPV=NO,ITUFREQ=194200-194300-194400-194500-194700-
194800-194900-195000:IS"
"PSC-1-2-25:::IS"
"ILAN-1-2-27:::IS"
"PSC-1-2-48:::IS"
"FAN-1-2-49:::IS"
"SHELF-1-3::SHELFTYPE=EXPANSION:IS"
"SC-1-3-1:::IS"
"OMD-1-3-3::BOARDTYPE=OMDX,MATEID=OMD-1-1-
3,FREQ=20,SPV=NO,ITUFREQ=192000-192100-192200-192300-192500-
192600-192700-192800:IS"
"TDM-1-3-4::BOARDTYPE=TDM_SFP:OOS-AU,UEQ"

TABLE 1-continued

Sample TL1 Messages Communicated Between an EMS and
Resources to Retrieve Information Regarding the Resources "TDM-1-3-4-5::BOARDTYPE=S161,MATEID=MCC-1-2-19:OOS-AU,UEQ"
  "MVAC-1-3-9::ATTNFCT=3,ATTNFCT2=20:OOS-AU,UEQ"
  "WLA-1-3-11::BOARDTYPE=WLA3CD:IS"
  "WLA-1-3-11-1::BOARDTYPE=I16:IS"
  "WLA-1-3-11-2::BOARDTYPE=CBRONZE,FREQ=53,ITUFREQ=1530:IS"
  "CMDX2-1-3-12::BOARDTYPE=CMDX2,TRANS=NO:OOS-AU"
  "OCC-1-3-21::BOARDTYPE=OCC10_XFP,MATEID=OMD-1-3-3,FREQ=20,SIGTYPE=SONET,ITUFREQ=192000,ATTNFCT=16,DTV=2,NCD=0:IS"
  "OCC-1-3-21-1::BOARDTYPE=S642B:IS"
  "OMD-1-3-22::BOARDTYPE=OMDX,MATEID=OMD-1-1-22,FREQ=20,SPV=NO,ITUFREQ=192000-192100-192200-192300-192500-192600-192700-192800:IS"
  "PSC-1-3-25:::OOS-AU"
  "ILAN-1-3-27:::IS"
  "PSC-1-3-48:::IS"
  "FAN-1-3-49:::IS"
  "SHELF-1-4::SHELFTYPE=EXPANSION:IS"
  "SC-1-4-1:::IS"
  "OMD-1-4-3::BOARDTYPE=OMDX,MATEID=OMD-1-2-3,FREQ=52,SPV=NO,ITUFREQ=195200-195300-195400-195500-195700-195800-195900-196000:IS"
  "TDM-1-4-4::BOARDTYPE=INTROF:OOS-AUMA,UEQ"
  "TDM-1-4-4-3::BOARDTYPE=LF850,SIGTYPE=FE:OOS-AU,UEQ"
  "TDM-1-4-4-4::BOARDTYPE=LF850,SIGTYPE=FE:OOS-AU,UEQ"
  "TDM-1-4-6::BOARDTYPE=INTROF:OOS-AUMA,UEQ"
  "TDM-1-4-6-1::BOARDTYPE=LF850,SIGTYPE=FE:OOS-AU,UEQ"
  "TDM-1-4-6-4::BOARDTYPE=LF850,SIGTYPE=FE:OOS-AU,UEQ"
  "TDM-1-4-8::BOARDTYPE=INTROF:OOS-AUMA,UEQ"
  "TDM-1-4-8-1::BOARDTYPE=LF850,SIGTYPE=FE:OOS-AU,UEQ"
  "TDM-1-4-8-4::BOARDTYPE=LF850,SIGTYPE=FE:OOS-AU,UEQ"
  "MCC-1-4-20::BOARDTYPE=MCC3,FREQ=58,SIGTYPE=SONET,ITUFREQ=195800,ATTNFCT=AU,UEQ"
  "PSC-1-4-25:::OOS-AU"
  "ILAN-1-4-27:::IS"
  "OPC-1-4-28:::OOS-AU,UEQ"
  "OPC-1-4-31:::OOS-AU,UEQ"
  "OPC-1-4-32:::OOS-AU,UEQ"
  "OPC-1-4-33:::OOS-AU,UEQ"
  "PSC-1-4-48:::IS"
  "FAN-1-4-49:::IS"
2007-07-13 11:04:03,714 : Sending TL1 command (user unknown):
RTRV-OC48:PSC1696-3:ALL:H23176;
M H23176 COMPLD
  "OC48-1-3-4-1:::OOS-AU"
  "OC48-1-2-14-1:::OOS-AU"
  "OC48-1-1-14-1:::OOS-AU"
  "OC48-1-4-8-1:::OOS-AU"
  "OC48-1-4-6-1:::OOS-AU"
  "OC48-1-4-4-1:::OOS-AU"
  "OC48-1-1-8-1:::OOS-AU"
  "OC48-1-1-6-1:::IS"
2007-07-13 11:04:04,653 : Sending TL1 command (user unknown):
RTRV-OGS:PSC1696-3:ALL:H23178;
M H23178 COMPLD
  "OGS-1-2-11-2::,RATE=2488.320:IS"
  "OGS-1-2-11-2-1::,RATE=1250.000:IS"
  "OGS-1-4-20-2:::OOS-AU"
  "OGS-1-3-21-1::SIGTYPE=SONET,RATE=192:OOS-AU"
  "OGS-1-3-11-2::,RATE=2488.320:OOS-AU"
  "OGS-1-3-11-1::,RATE=2488.320:IS"
  "OGS-1-2-18-1::SIGTYPE=SONET,RATE=48:OOS-AU"
  "OGS-1-1-5-2::OOS-AU"
  "OGS-1-2-21-1::SIGTYPE=SONET,RATE=48:OOS-AU"
  "OGS-1-2-19-1::SIGTYPE=SONET,RATE=48:IS"
  "OGS-1-2-6-1::SIGTYPE=SONET,RATE=3:IS"
  "OGS-1-2-5-1::SIGTYPE=SONET,RATE=12:IS"
  "OGS-1-1-19-1::SIGTYPE=SONET,RATE=3:IS"
  "OGS-1-1-18-1::SIGTYPE=SONET,RATE=3:IS"
  "OGS-1-1-17-1::SIGTYPE=SONET,RATE=48:OOS-AU"
  "OGS-1-1-11-1::SIGTYPE=SONET,RATE=48:IS"
  "OGS-1-1-10-1::SIGTYPE=SONET,RATE=48:IS"
  "OGS-1-1-4-1::SIGTYPE=SONET,RATE=48:IS"
  "OGS-1-4-8-4-1::SIGTYPE=FE,RATE=100.000:OOS-AU"
  "OGS-1-4-8-1-1::SIGTYPE=FE,RATE=100.000:OOS-AU"
  "OGS-1-4-6-4-1::SIGTYPE=FE,RATE=100.000:OOS-AU"
  "OGS-1-4-6-1-1::SIGTYPE=FE,RATE=100.000:OOS-AU"
  "OGS-1-4-4-4-1::SIGTYPE=FE,RATE=100.000:OOS-AU"

TABLE 1-continued

Sample TL1 Messages Communicated Between an EMS and
Resources to Retrieve Information Regarding the Resources "OGS-1-4-4-3-1::SIGTYPE=FE,RATE=100.000:OOS-AU"
"OGS-1-1-8-4-1::SIGTYPE=SONET,RATE=3:OOS-AU"
"OGS-1-1-8-3-1::SIGTYPE=GE,RATE=1250.000:OOS-AU"
"OGS-1-1-6-4-1::SIGTYPE=SONET,RATE=3:IS"
"OGS-1-1-6-3-1::SIGTYPE=GE,RATE=1250.000:OOS-AU"
2007-07-13 11:04:07,550 : Sending TL1 command (user unknown):
RTRV-OTS:PSC1696-3:ALL:H23180;
M H23180 COMPLD
  "OTS-1-1-22-1::SUPPBRD=OMD-1-1-22:IS"
  "OTS-1-1-12-1::SUPPBRD=OAC-1-1-12:IS"
2007-07-13 11:04:07,938 : Sending TL1 command (user unknown):
RTRV-OCH:PSC1696-3:ALL:H23184;
M H23184 COMPLD
  "OGSOCH-1-2-17-2-1::,SUPPBRD=2XGE-1-2-17:IS"
  "OGSOCH-1-2-17-2-1-1::,SUPPBRD=2XGE-1-2-17:IS"
  "OGSOCH-1-2-17-1-1-1::,SUPPBRD=2XGE-1-2-17,RATE=192:IS"
  "OGSOCH-1-2-11-2-1::,SUPPBRD=2XGE-1-2-11:IS,ACT"
  "OGSOCH-1-2-11-2-1-1::,SUPPBRD=2XGE-1-2-11:IS"
  "OGSOCH-1-2-11-1-1-1::,SUPPBRD=2XGE-1-2-11:IS"
  "OGSOCH-1-4-20-1-1::ITUFREQ=195800,SUPPBRD=MCC-1-4-20:IS"
  "OGSOCH-1-3-21-1-1::ITUFREQ=192000,SUPPBRD=OCC-1-3-21:IS,ACT"
  "OGSOCH-1-3-11-4-1::,SUPPBRD=WLA-1-3-11:IS"
  "OGSOCH-1-3-11-3-1::,SUPPBRD=WLA-1-3-11:IS"
  "OGSOCH-1-3-11-2-1::,SUPPBRD=WLA-1-3-11:IS"
  "OGSOCH-1-3-11-1-1::,SUPPBRD=WLA-1-3-11:IS"
  "OGSOCH-1-2-18-1-1::ITUFREQ=194400,SUPPBRD=MCC-1-2-18:IS,ACT"
  "OGSOCH-1-1-5-1-1::ITUFREQ=193500,SUPPBRD=MCC-1-1-5:IS"
  "OGSOCH-1-2-21-1-1::ITUFREQ=195000,SUPPBRD=MCC-1-2-21:IS,ACT"
  "OGSOCH-1-2-19-1-1::ITUFREQ=194800,SUPPBRD=MCC-1-2-19:IS,ACT"
  "OGSOCH-1-2-6-1-1::ITUFREQ=194500,SUPPBRD=MCC-1-2-6:OOS-
AU,ACT"
  "OGSOCH-1-2-5-1-1::ITUFREQ=194300,SUPPBRD=MCC-1-2-5:IS,ACT"
  "OGSOCH-1-1-19-1-1::ITUFREQ=193600,SUPPBRD=MCC-1-1-19:IS"
  "OGSOCH-1-1-18-1-1::ITUFREQ=193600,SUPPBRD=MCC-1-1-18:IS,ACT"
  "OGSOCH-1-1-17-1-1::ITUFREQ=193300,SUPPBRD=MCC-1-1-17:IS,ACT"
  "OGSOCH-1-1-11-1-1::ITUFREQ=193700,SUPPBRD=MCC-1-1-
11:IS,STBYH"
  "OGSOCH-1-1-10-1-1::ITUFREQ=195800,SUPPBRD=MCC-1-1-10:IS,WRK"
  "OGSOCH-1-1-4-1-1::ITUFREQ=193000,SUPPBRD=MCC-1-1-4:IS,ACT"
  "OGSOCH-1-4-20-2-1::ITUFREQ=195800,SUPPBRD=MCC-1-4-
20,RATE=2488.320:IS"
  "OGSOCH-1-1-5-2-1::ITUFREQ=193500,SUPPBRD=MCC-1-1-
5,RATE=2488.320:IS"
  "OTSOCH-1-1-22-1-44::ITUFREQ=194400,SUPPBRD=OMD-1-2-22&MCC-1-
2-18,RATE=2488.320:OOS-AU,ACT"
  "OTSOCH-1-1-22-1-28::ITUFREQ=192800,SUPPBRD=OMD-1-3-22:IS"
  "OTSOCH-1-1-22-1-27::ITUFREQ=192700,SUPPBRD=OMD-1-3-22:IS"
  "OTSOCH-1-1-22-1-26::ITUFREQ=192600,SUPPBRD=OMD-1-3-22:IS"
  "OTSOCH-1-1-22-1-25::ITUFREQ=192500,SUPPBRD=OMD-1-3-22:IS"
  "OTSOCH-1-1-22-1-23::ITUFREQ=192300,SUPPBRD=OMD-1-3-22:IS"
  "OTSOCH-1-1-22-1-22::ITUFREQ=192200,SUPPBRD=OMD-1-3-22:IS"
  "OTSOCH-1-1-22-1-21::ITUFREQ=192100,SUPPBRD=OMD-1-3-22:IS"
  "OTSOCH-1-1-22-1-20::ITUFREQ=192000,SUPPBRD=OMD-1-3-22:IS"
  "OTSOCH-1-1-22-1-50::ITUFREQ=195000,SUPPBRD=OMD-1-2-22&MCC-1-
2-21:OOS-AU,ACT"
  "OTSOCH-1-1-22-1-49::ITUFREQ=194900,SUPPBRD=OMD-1-2-22:IS"
  "OTSOCH-1-1-22-1-48::ITUFREQ=194800,SUPPBRD=OMD-1-2-22&MCC-1-
2-19:IS,ACT"
  "OTSOCH-1-1-22-1-47::ITUFREQ=194700,SUPPBRD=OMD-1-2-22:IS"
  "OTSOCH-1-1-22-1-45::ITUFREQ=194500,SUPPBRD=OMD-1-2-22&MCC-1-
2-6:OOS-AU,ACT"
  "OTSOCH-1-1-22-1-43::ITUFREQ=194300,SUPPBRD=OMD-1-2-22:IS"
  "OTSOCH-1-1-22-1-42::ITUFREQ=194200,SUPPBRD=OMD-1-2-22:IS"
  "OTSOCH-1-1-22-1-38::ITUFREQ=193800,SUPPBRD=OMD-1-1-22:IS"
  "OTSOCH-1-1-22-1-37::ITUFREQ=193700,SUPPBRD=OMD-1-1-22&MCC-1-
1-11:IS,ACT"
  "OTSOCH-1-1-22-1-36::ITUFREQ=193600,SUPPBRD=OMD-1-1-22&MCC-1-
1-19:IS"
  "OTSOCH-1-1-22-1-35::ITUFREQ=193500,SUPPBRD=OMD-1-1-22:IS"
  "OTSOCH-1-1-22-1-33::ITUFREQ=193300,SUPPBRD=OMD-1-1-22&MCC-1-
1-17:IS,ACT"
  "OTSOCH-1-1-22-1-32::ITUFREQ=193200,SUPPBRD=OMD-1-1-22:IS"
  "OTSOCH-1-1-22-1-31::ITUFREQ=193100,SUPPBRD=OMD-1-1-22:IS"
  "OTSOCH-1-1-22-1-30::ITUFREQ=193000,SUPPBRD=OMD-1-1-22:IS"
  "OTSOCH-1-1-12-1-20::ITUFREQ=192000,SUPPBRD=OMD-1-3-3&OCC-1-
3-21:OOS-AU,ACT"
  "OTSOCH-1-1-12-1-60::ITUFREQ=196000,SUPPBRD=OMD-1-4-3:IS"

TABLE 1-continued

Sample TL1 Messages Communicated Between an EMS and
Resources to Retrieve Information Regarding the Resources "OTSOCH-1-1-12-1-59::ITUFREQ=195900,SUPPBRD=OMD-1-4-3:IS"
"OTSOCH-1-1-12-1-58::ITUFREQ=195800,SUPPBRD=OMD-1-4-3&MCC-1-
1-10:IS,ACT"
"OTSOCH-1-1-12-1-57::ITUFREQ=195700,SUPPBRD=OMD-1-4-3:IS"
"OTSOCH-1-1-12-1-55::ITUFREQ=195500,SUPPBRD=OMD-1-4-3:IS"
"OTSOCH-1-1-12-1-54::ITUFREQ=195400,SUPPBRD=OMD-1-4-3:IS"
"OTSOCH-1-1-12-1-53::ITUFREQ=195300,SUPPBRD=OMD-1-4-3:IS"
"OTSOCH-1-1-12-1-52::ITUFREQ=195200,SUPPBRD=OMD-1-4-3:IS"
"OTSOCH-1-1-12-1-28::ITUFREQ=192800,SUPPBRD=OMD-1-3-3:IS"
"OTSOCH-1-1-12-1-27::ITUFREQ=192700,SUPPBRD=OMD-1-3-3:IS"
"OTSOCH-1-1-12-1-26::ITUFREQ=192600,SUPPBRD=OMD-1-3-3:IS"
"OTSOCH-1-1-12-1-25::ITUFREQ=192500,SUPPBRD=OMD-1-3-3:IS"
"OTSOCH-1-1-12-1-23::ITUFREQ=192300,SUPPBRD=OMD-1-3-3:IS"
"OTSOCH-1-1-12-1-22::ITUFREQ=192200,SUPPBRD=OMD-1-3-3:IS"
"OTSOCH-1-1-12-1-21::ITUFREQ=192100,SUPPBRD=OMD-1-3-3:IS"
"OTSOCH-1-1-12-1-50::ITUFREQ=195000,SUPPBRD=OMD-1-2-3:IS"
"OTSOCH-1-1-12-1-49::ITUFREQ=194900,SUPPBRD=OMD-1-2-3:IS"
"OTSOCH-1-1-12-1-48::ITUFREQ=194800,SUPPBRD=OMD-1-2-3:IS"
"OTSOCH-1-1-12-1-47::ITUFREQ=194700,SUPPBRD=OMD-1-2-3:IS"
"OTSOCH-1-1-12-1-45::ITUFREQ=194500,SUPPBRD=OMD-1-2-3:IS"
"OTSOCH-1-1-12-1-44::ITUFREQ=194400,SUPPBRD=OMD-1-2-3:IS"
"OTSOCH-1-1-12-1-43::ITUFREQ=194300,SUPPBRD=OMD-1-2-3&MCC-1-
2-5:IS,ACT"
"OTSOCH-1-1-12-1-42::ITUFREQ=194200,SUPPBRD=OMD-1-2-3:IS"
"OTSOCH-1-1-12-1-38::ITUFREQ=193800,SUPPBRD=OMD-1-1-3:IS"
"OTSOCH-1-1-12-1-37::ITUFREQ=193700,SUPPBRD=OMD-1-1-3:IS"
"OTSOCH-1-1-12-1-36::ITUFREQ=193600,SUPPBRD=OMD-1-1-3&MCC-1-
1-18:IS,ACT"
"OTSOCH-1-1-12-1-35::ITUFREQ=193500,SUPPBRD=OMD-1-1-3:IS"
"OTSOCH-1-1-12-1-33::ITUFREQ=193300,SUPPBRD=OMD-1-1-3:IS"
"OTSOCH-1-1-12-1-32::ITUFREQ=193200,SUPPBRD=OMD-1-1-3:IS"
"OTSOCH-1-1-12-1-31::ITUFREQ=193100,SUPPBRD=OMD-1-1-3:IS"
"OTSOCH-1-1-12-1-30::ITUFREQ=193000,SUPPBRD=OMD-1-1-3&MCC-1-
1-4:IS,ACT"
"OGSOCH-1-4-8-4-1-1::,SUPPBRD=TDM-1-4-8-4:IS"
"OGSOCH-1-4-8-1-1-1::,SUPPBRD=TDM-1-4-8-1:IS"
"OGSOCH-1-4-6-4-1-1::,SUPPBRD=TDM-1-4-6-4:IS"
"OGSOCH-1-4-6-1-1-1::,SUPPBRD=TDM-1-4-6-1:IS"
"OGSOCH-1-4-4-4-1-1::,SUPPBRD=TDM-1-4-4-4:IS"
"OGSOCH-1-4-4-3-1-1::,SUPPBRD=TDM-1-4-4-3:IS"
"OGSOCH-1-1-8-4-1-1::,SUPPBRD=TDM-1-1-8-4:IS,STBYH"
"OGSOCH-1-1-8-3-1-1::,SUPPBRD=TDM-1-1-8-3:IS,WRK"
"OGSOCH-1-1-6-4-1-1::,SUPPBRD=TDM-1-1-6-4:IS,WRK"
"OGSOCH-1-1-6-3-1-1::,SUPPBRD=TDM-1-1-6-3:IS,STBYH"
"OC48OCH-1-3-4-1-1::,SUPPBRD=TDM-1-3-4:IS"
"OC48OCH-1-2-14-1-1::,SUPPBRD=TDM-1-2-14:IS"
"OC48OCH-1-1-14-1-1::,SUPPBRD=TDM-1-1-14:IS"
"OC48OCH-1-4-8-1-1::,SUPPBRD=TDM-1-4-8:IS"
"OC48OCH-1-4-6-1-1::,SUPPBRD=TDM-1-4-6:IS"
"OC48OCH-1-4-4-1-1::,SUPPBRD=TDM-1-4-4:IS"
"OC48OCH-1-1-8-1-1::,SUPPBRD=TDM-1-1-8:IS,ACT"
"OC48OCH-1-1-6-1-1::,SUPPBRD=TDM-1-1-6:IS,ACT"

Those skilled in the pertinent art also understand that conventional EMSs often use a database (flat or relational) to store current information regarding the resources in a WDM optical network. Accordingly, FIG. 1 shows information being communicated (as represented by a line 140) between the EMS 130 and an EMS database 150. The information reflects hierarchical relationships between nodes that have shelves, shelves that contain cards and may have sub-shelves, cards that may or may not have drawers containing sub-cards, cards and sub-cards that contain ports, ports that contain facilities, and so on. In the environment of FIG. 1, the EMS database 150 operates in accordance with the well-known Structured Query Language, or SQL, though this is not necessary to the invention. The EMS database 150 itself is not necessary to the invention; the system may collect the information directly from the WDM optical network 110, for example. Given the operation of the EMS 130, the EMS database 150 is assumed to contain reasonably current information regarding input and output signals from each shelf, sub-shelf, card, sub-card, port and facility in the WDM optical network 110.

The visual representation generating system 170 of FIG. 1 includes a connectivity, pass-through and error identifier 171 and a connectivity, pass-through and error displayer 172 coupled thereto. One embodiment of the visual representation generating system 170 of FIG. 1 generates SQL queries 160 of the EMS database 150 to extract information regarding each shelf, sub-shelf, card, sub-card, port and facility in the WDM optical network 110. The information may be copied to a database (not shown), associated with the visual representation generating system 170. This is done to make the information more local with respect to the visual representation generating system 170 and to reduce the query load on the EMS database 150. The information need not be copied, however; the visual representation generating system 170 may continue to interact directly with the EMS database 150.

The connectivity, pass-through and error identifier 171 is configured to identify connectivity, pass-throughs and termination errors with respect to at least some of the nodes of the WDM optical network 110. As stated above, the information contained in the TL1 messages reflects hierarchical relationships between nodes that have shelves, shelves that contain cards and may have sub-shelves, cards that may or may not have drawers containing sub-cards, cards and sub-cards that contain ports, ports that contain facilities, and so on. However, that information is highly diffused throughout the TL1 messages and often implicit and sometimes only apparent given specific knowledge of resource capacities and constraints. The connectivity, pass-through and error identifier 171 carries out computer-implemented methods that will be described in detail below to ascertain those hierarchical relationships and stores them in the local database as well. In the specific embodiment of FIG. 1, the connectivity, pass-through and error identifier 171 is configured to identify connectivity, pass-throughs and termination errors with respect to all of the nodes of the WDM optical network 110.

Connectivity is the manner in which the resources are interconnected. In the context of FIG. 1, connectivity reflects which cards or sub-cards are plugged into which slots of which shelves, which ports of the cards or sub-cards are coupled to one another and which facilities are associated with which ports.

Pass-throughs occur when one or more wavelengths transit a node without adding or dropping. In the context of FIG. 1, pass-throughs are of two types: fiber pass-throughs and band pass-throughs. Fiber pass-throughs occur with respect to a single wavelength; band pass-throughs occur with respect to multiple wavelengths.

Termination errors result from a lack of pass-through or termination with respect to a particular wavelength. Termination errors cause an optical circuit to be incomplete and therefore unusable. A well-functioning WDM optical network should be free of termination errors that would compromise its operation.

The connectivity, pass-through and error identifier 171 may further be configured to identify protected or regenerated circuits. Protected circuits are deemed important enough to have two paths through the WDM optical network 110: a primary path and a backup path in case the primary path fails. The optical signals of regenerated circuits are received into a node, converted into electrical form and back into optical form for retransmission. Regeneration amounts to optical repeating. The retransmission reconstitutes the optical signal, which is particularly useful for long-haul or degraded segments.

In a manner that will be described below in greater detail, the connectivity, pass-through and error identifier 171 parses the information concerning the resources to identify connectivity, pass-throughs and termination errors and perhaps protected and regenerated circuits. Once identified, the connectivity, pass-through and error displayer 172 is configured to generate a visual representation 180 that indicates the connectivity and any pass-throughs, termination errors or protected or regenerated circuits. The visual representation 180 then may be displayed on a screen, printed on paper or conveyed in any other conventional or later-developed way to a person or further system. Having now described some embodiments of the visual representation generating system 170 and its environment, some aspects of its operation will now be described.

Figure 2A:
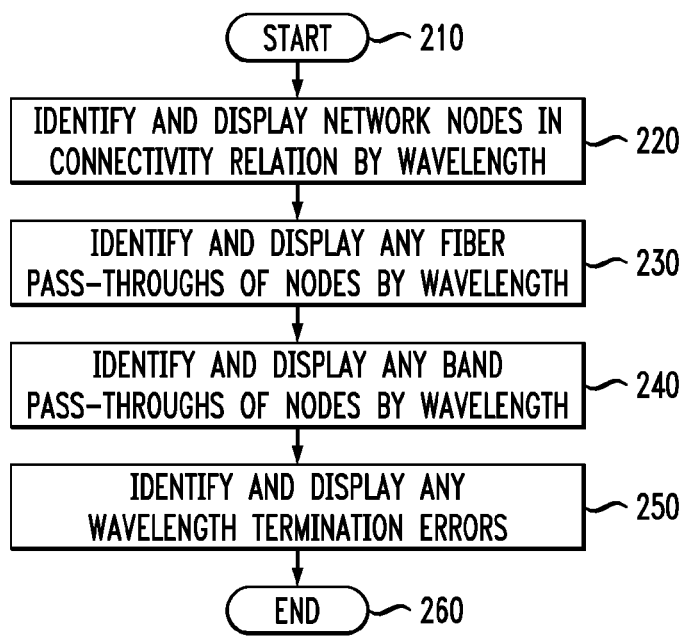
FIG. 2A illustrates a flow diagram of one embodiment of a computer-implemented method of generating a visual representation of a WDM optical network carried out according to the principles of the invention.

FIG. 2A illustrates a flow diagram of one embodiment of a computer-implemented method of generating a visual representation of a WDM optical network carried out according to the principles of the invention. The flow diagram of FIG. 2A is an overview of one embodiment of the method. FIGS. 2B-2E illustrate flow diagrams providing more detail regarding certain embodiments of the method.

The method of FIG. 2A begins in a start step 210, when it is desired to generate a visual representation of a WDM optical network. In a step 220, nodes of the WDM optical network are identified and displayed in connectivity relation by wavelength. In a step 230, any fiber pass-throughs of nodes by wavelength are identified and displayed. In a step 240, any band pass-throughs of nodes by wavelength are identified and displayed. In a step 250, any wavelength termination errors are identified and displayed. The method ends in an end step 260.

Figure 2B:
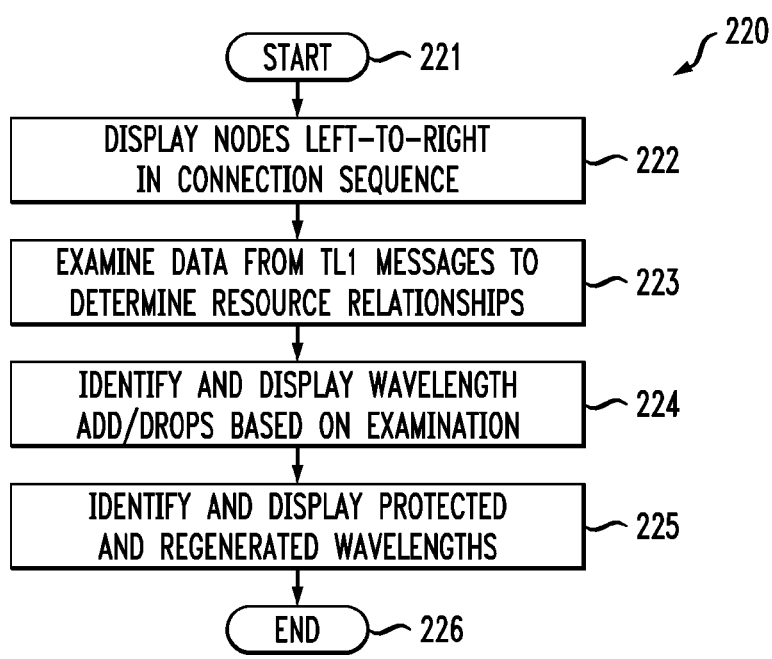

FIGS. 2B-2E illustrate more detailed flow diagrams of first, second, third and fourth steps of the method of FIG. 2A. Turning now to FIG. 2B, one embodiment of a method of identifying and displaying nodes of the WDM optical network in connectivity relation by wavelength is illustrated. The method begins in a start step 221. In a step 222, the nodes are displayed left-to-right in connection sequence. In a step 223, data from TL1 messages is examined to determine resource relationships. In a step 224, wavelength adds and drops are identified and displayed based on the examination of the TL1 messages that was carried out in the step 223. In a step 225, protected and regenerated wavelengths are identified and displayed. The method ends in an end step 226. At this point, the visual representation displays each node in the WDM optical network in connectivity relation to its neighbors. Each node has been analyzed independently, and all of the wavelengths that the node adds and drops in each direction in the WDM optical network have been displayed. Next, all of the wavelengths added and dropped in the WDM optical network will be correlated to each other to identify fiber and band pass-throughs and termination errors, if any.

Figure 2C:
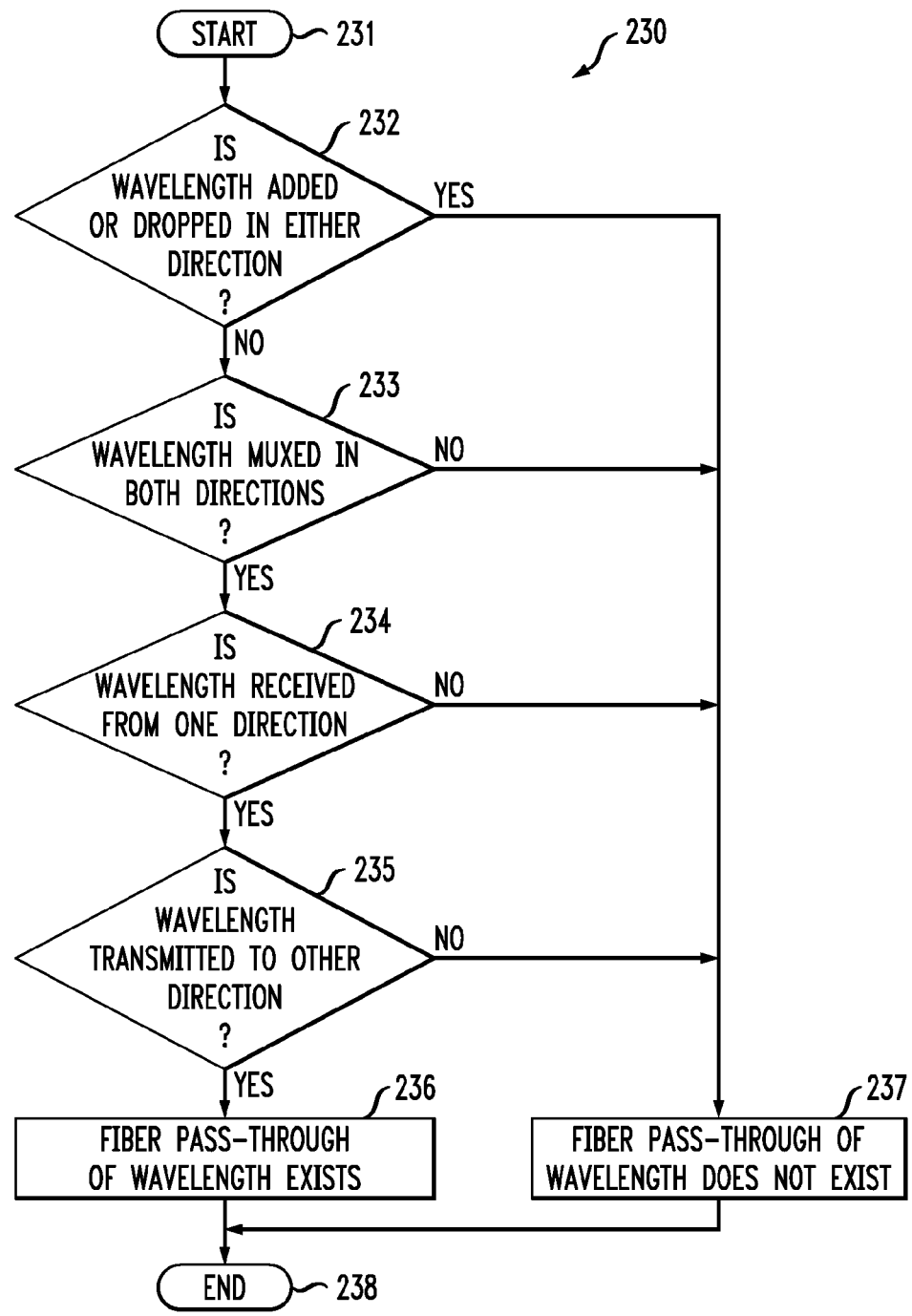

Turning now to FIG. 2C, one embodiment of a method of identifying and displaying any fiber pass-throughs of nodes by wavelength is illustrated. The illustrated embodiment of the method of FIG. 2C repeats for each wavelength identified in the method of FIG. 2B. The method begins in a step 231. In a decisional step 232, it is determined whether a particular wavelength has been added or dropped in either direction (of fiber entering or exiting the node, e.g., east or west). If not, a decisional step 233 determines whether the particular wavelength is multiplexed in both directions. If so, a decisional step 234 determines whether the particular wavelength is received from one direction (e.g., east). If so, a decisional step 235 determines whether the particular wavelength is transmitted to the other direction (e.g., west). If so, a fiber pass-through of the particular wavelength exists and is so identified in a step 236. If, on the other hand, the particular wavelength is added or dropped in either direction, the particular wavelength is not multiplexed in both directions, the particular wavelength is not received from one direction, or the particular wavelength is not transmitted to the other direction, a fiber pass-through of the particular wavelength is determined not to exist in a step 237. Once the method of FIG. 2C has been repeated for each wavelength identified in the method of FIG. 2B, the method ends in an end step 238.

Turning now to FIG. 2D, one embodiment of a method of identifying and displaying any band pass-throughs of nodes by wavelength is illustrated. The illustrated embodiment of the method of FIG. 2D repeats for each wavelength identified in the method of FIG. 2B. The method begins in a step 241. In a decisional step 242, it is determined whether a particular wavelength has been added or dropped in either direction. If not, a decisional step 243 determines whether the particular wavelength is multiplexed in both directions. If not, a decisional step 244 determines whether the particular wavelength is received from one direction. If so, a decisional step 245 determines whether the particular wavelength is transmitted to the other direction. If so, a band pass-through of the particular wavelength exists and is so identified in a step 246. If, on the other hand, the particular wavelength is added or dropped in either direction, the particular wavelength is multiplexed in both directions, the particular wavelength is not received from one direction, or the particular wavelength is not transmitted to the other direction, a band pass-through of the particular wavelength is determined not to exist in a step 247. Once the method of FIG. 2D has been repeated for each wavelength identified in the method of FIG. 2B, the method ends in an end step 248.

Turning now to FIG. 2E, one embodiment of a method of identifying and displaying one particular type of termination error of circuits by wavelength is illustrated. The illustrated embodiment of the method of FIG. 2E repeats for each wavelength identified in the method of FIG. 2B. The method begins in a step 251. In a decisional step 252, it is determined whether a particular wavelength has been received from one direction (e.g., east). If so, a decisional step 253 determines whether the particular wavelength is demultiplexed in the one direction (e.g., east). If not, a decisional step 254 determines whether the particular wavelength has been received from the other direction (e.g., west). If so, a decisional step 255 determines whether the particular wavelength is demultiplexed in the other direction (e.g., west). If so, a termination error of the particular wavelength is determined to exist in a step 256. The absence of demultiplexing of the wavelength received from the one direction (e.g., east) precludes a fiber pass-through. Thus, only a band pass-through could avoid a termination error. However, the demultiplexing of the wavelength received from the other direction (e.g., west) precludes a band pass-through. If a termination error were not to exist, such would be determined in a step 257. Once the method of FIG. 2E has been repeated for each wavelength identified in the method of FIG. 2B, the method ends in an end step 258.

As stated above, the method of FIG. 2E is directed to one particular type of termination error. Other types of termination errors exist. For example, a second type of termination error exists if a wavelength is received from one direction, is demultiplexed and properly terminated in the one direction, received from the other direction and demultiplexed but not properly terminated in the other direction. An example of this second type of termination error will be identified in the visual representation of FIG. 3B, below. Still further types of termination errors exist as well as the two described above and are identified in various embodiments of the method of FIG. 2A.

Having now described some aspects of the operation of the visual representation generating system 170, some embodiments of the visual representation it may generate will now be described. FIGS. 3A-3E together illustrate screen shots of one embodiment of a visual representation of a WDM optical network as it is being generated according to the method of FIGS. 2A-2E. The WDM optical network is managed by an EMS that has an associated EMS database containing data in the form of TL1 messages generated by the WDM optical network in response to queries contained in TL1 messages generated by the EMS.

The visual representation of FIGS. 3A-3E takes the form of a spreadsheet having columns and rows. Excel®, which is commercially available from the Microsoft Corporation of Redmond, Wash., is a spreadsheet application program that was chosen to provide the environment within which the spreadsheet-based visual representation of FIGS. 3A-3E is formed. Visual Basic, also commercially available from the Microsoft Corporation, is a software language and development tool that was chosen to enable the methods of FIGS. 2A-2E to be carried out on the spreadsheet-based visual representation of FIGS. 3A-3E. Those skilled in the pertinent art will understand, however, that the invention may be carried out using a variety of conventional or later-developed environments or tools and thus is not limited to Excel or Visual Basic or, indeed, a spreadsheet visual representation.

Figure 3A:
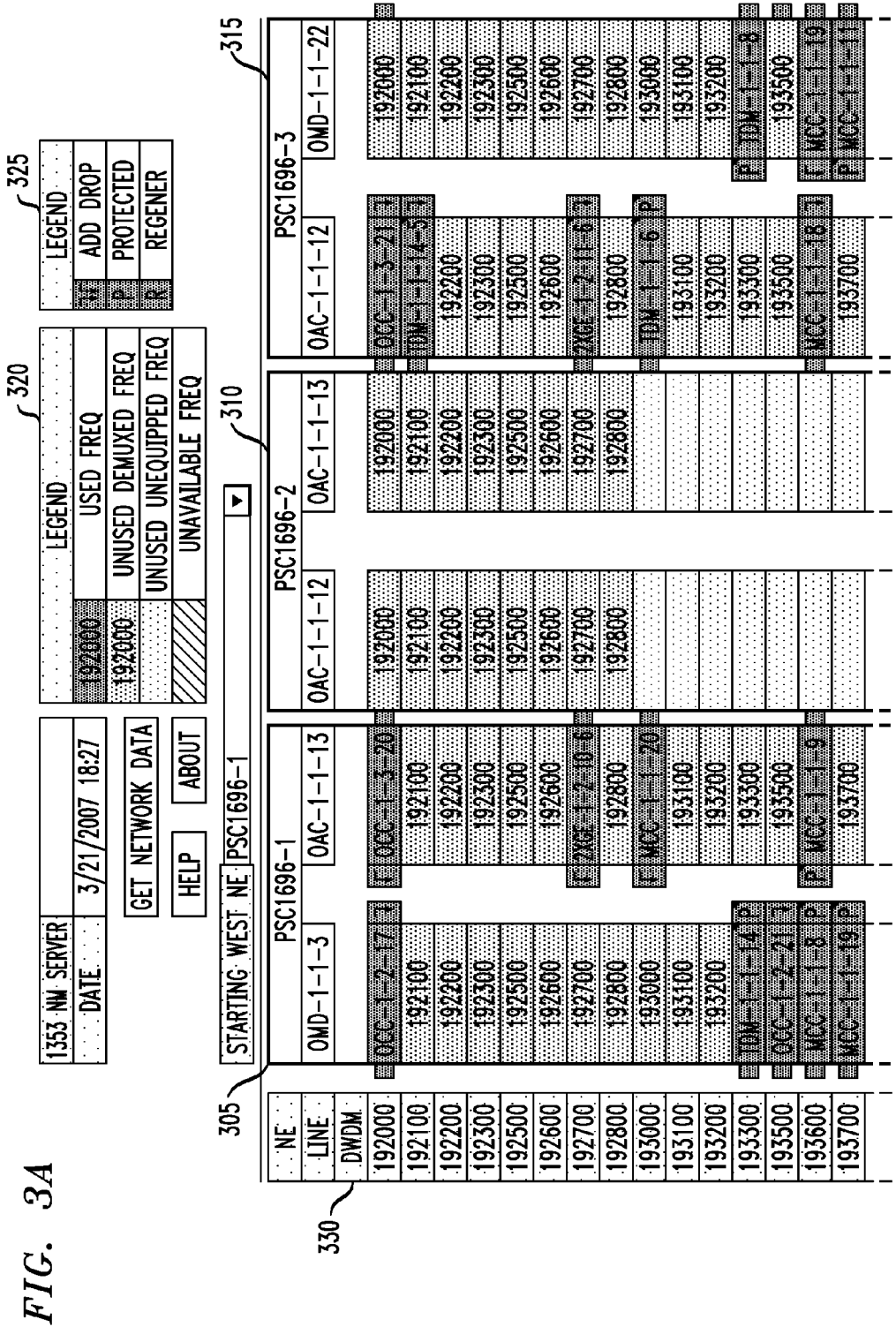
FIGS. 3A-3F together illustrate one embodiment of a visual representation of a WDM optical network as it is being generated according to the method of FIG. 2A.
Figure 3A:
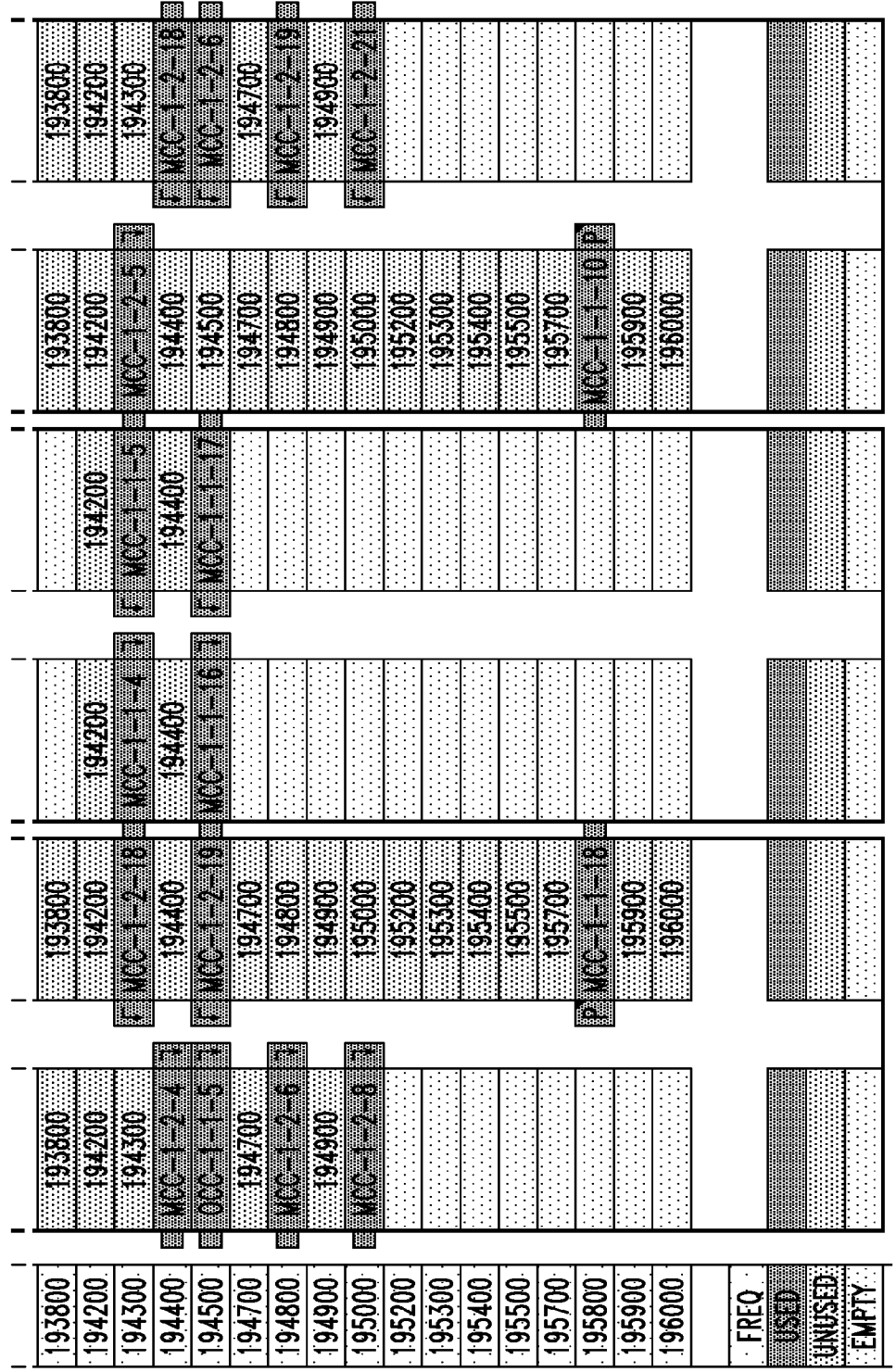

Turning now to FIG. 3A, illustrated is a screen shot of the visual representation after the method of FIG. 2B has been carried out with respect to the WDM optical network. Following an examination of data from TL1 messages retrieved from the EMS database, the WDM optical network is determined to be a DWDM optical network named PSC1696. The WDM optical network has three nodes named according to their target identifiers (TIDs), a PSC1696-1 node 305, a PSC1696-2 node 310 and a PSC1696-3 node 315, which are coupled in a ring configuration and displayed in connectivity relation to its neighbors. The PSC1696-1, PSC1696-2 and PSC1696-3 nodes 305, 310, 315 are arranged left-to-right in the visual representation as they are connected.

The PSC1696-1, PSC1696-2 and PSC1696-3 nodes 305, 310, 315 have been analyzed independently, and all of the wavelengths that the PSC1696-1, PSC1696-2 and PSC1696-3 nodes 305, 310, 315 add or drop in each direction in the WDM optical network have been displayed. This entails examining resource relationships to determine what equipment originates the signal to the point where it is inserted in the WDM optical network.

A left-hand legend 320 sets forth four categories for the status of each wavelength (or frequency, as those terms denote reciprocal optical properties): used frequencies, unused but demultiplexed frequencies, unused but unequipped (undemultiplexed) frequencies and unavailable frequencies. Used frequencies are already used and thus unavailable to increase the wavelength capacity of the WDM optical network. Unused but demultiplexed frequencies are not only available to increase wavelength capacity, they do not require an OMD to be added; they only require a transponder to be added. Unused but unequipped frequencies are available to increase wavelength capacity, but they require both an OMD and a transponder to be added. Unavailable frequencies are, for various reasons, not available to increase wavelength capacity. For example, the WDM optical network may not be able physically to support them, or they may produce unacceptable error rates.

A right-hand legend 325 sets forth three categories for the disposition of each wavelength: add drop, protected and regenerated. Those skilled in the pertinent art understand what these terms mean with respect to a particular wavelength.

A left-most column 330 lists various wavelengths ranging from 192000 to 196000 and associates these wavelengths with the PSC1696-1 node 305. Given this and the legends 320, 325, it is straightforward to use the visual representation to trace connectivity of each wavelength through the WDM optical network, including adds and drops and protected and regenerated circuits. Now the visual representation will be enhanced by identifying and displaying pass-throughs and termination errors.

Figure 3B:
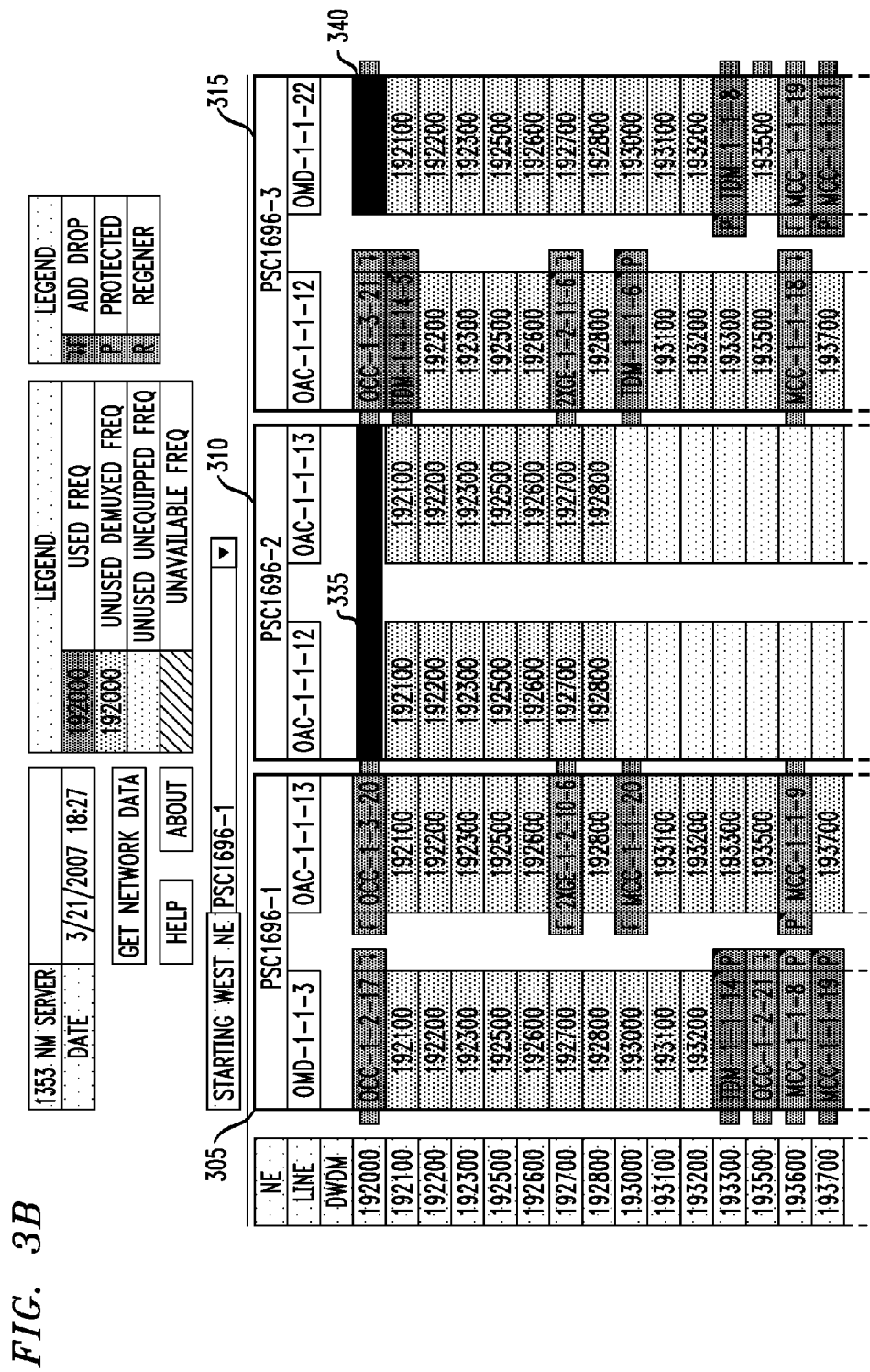
Figure 3B:
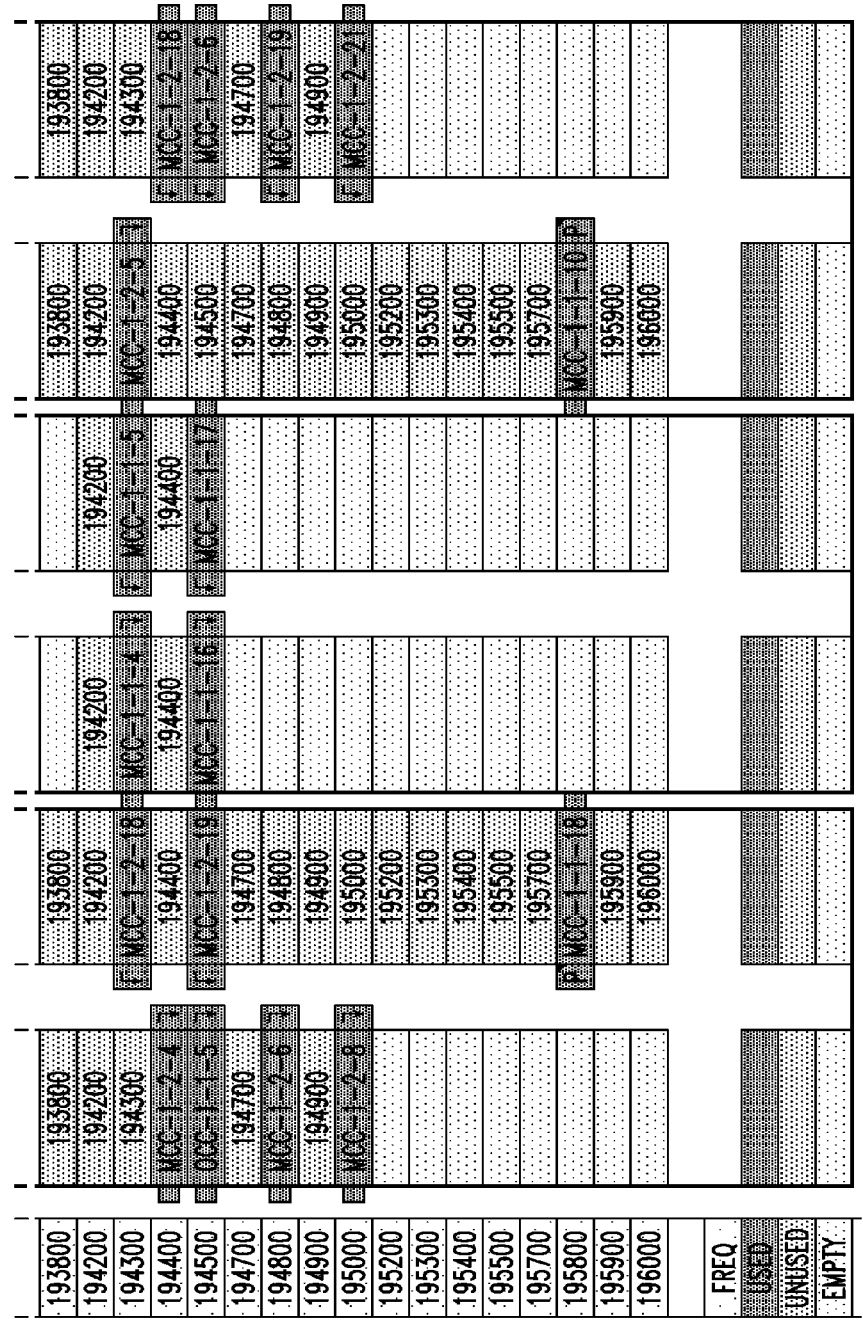

Accordingly, turning now to FIG. 3B, the methods of FIGS. 2C, 2D and 2E are carried out with respect to the 192000 wavelength traversing the PSC1696-2 node 310. In carrying out the method of FIG. 2C, a fiber pass-through 335 is identified. From an examination of TL1 messages, the following has been determined: (1) the PSC1696-2 node 310 does not add or drop the 192000 wavelength in either the east or west direction, (2) the PSC1696-2 node 310 does multiplex and demultiplex the 192000 wavelength in both the east and west directions, (3) the PSC1696-2 node 310 does receive the 192000 wavelength from the west direction (from the PSC1696-1 node 305) and (4) the PSC1696-2 node 310 does receive the 192000 wavelength from the east direction (from the PSC1696-3 node 315). The conclusion is that the PSC1696-2 node 310 must then be passing the 192000 wavelength though, and further that the ports for the 192000 wavelength on the multiplexer cards must be connected together via a crossover fiber for the 192000 wavelength at the PSC1696-2 node 310.

In carrying out the method of FIG. 2E, a termination error 345 is also identified with respect to the 192000 wavelength in the PSC1696-3 node 315. From an examination of TL1 messages, the following has been determined: (1) the PSC1696-3 node 315 does receive the 192000 wavelength from the east direction (from the PSC1696-1 node 305), (2) the PSC1696-3 node 315 does receive the 192000 wavelength from the west direction (from the PSC1696-2 node 310), (3) the PSC1696-3 node 315 does demultiplex the 192000 wavelength in both the east and west directions and (4) the PSC1696-3 node 315 does add or drop the 192000 wavelength in the west direction, but not the east direction. (The visual representation does not yet contain symbols indicating that the WDM optical network is in a ring configuration, but it is.) The conclusion is that the 192000 wavelength contains a termination error 340 in the PSC1696-3 node 315. The PSC1696-3 node 315 is not adding and dropping the signal it is receiving from the east direction. This is an occurrence of the second type of termination error described above.

Figure 3C:
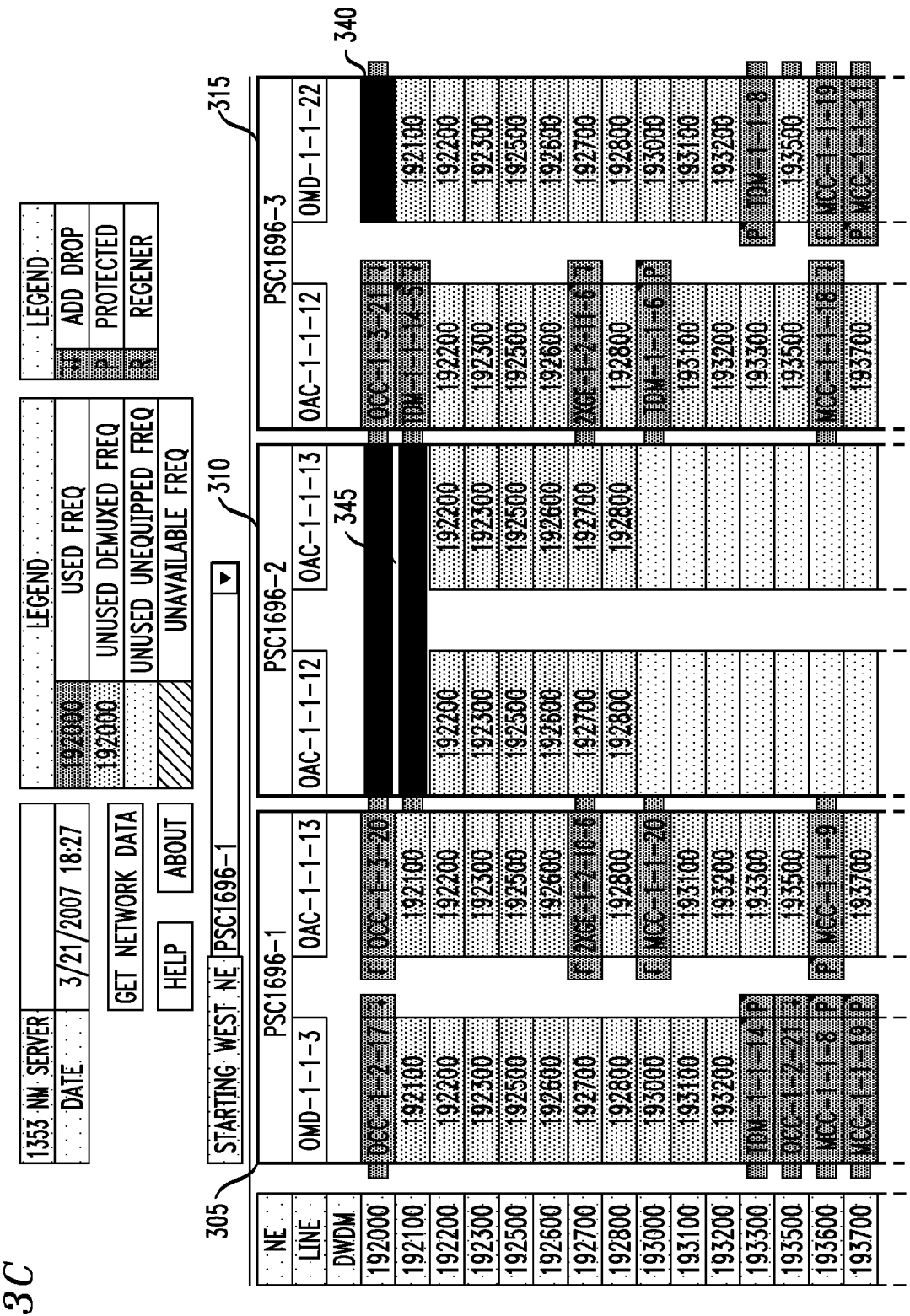
Figure 3C:
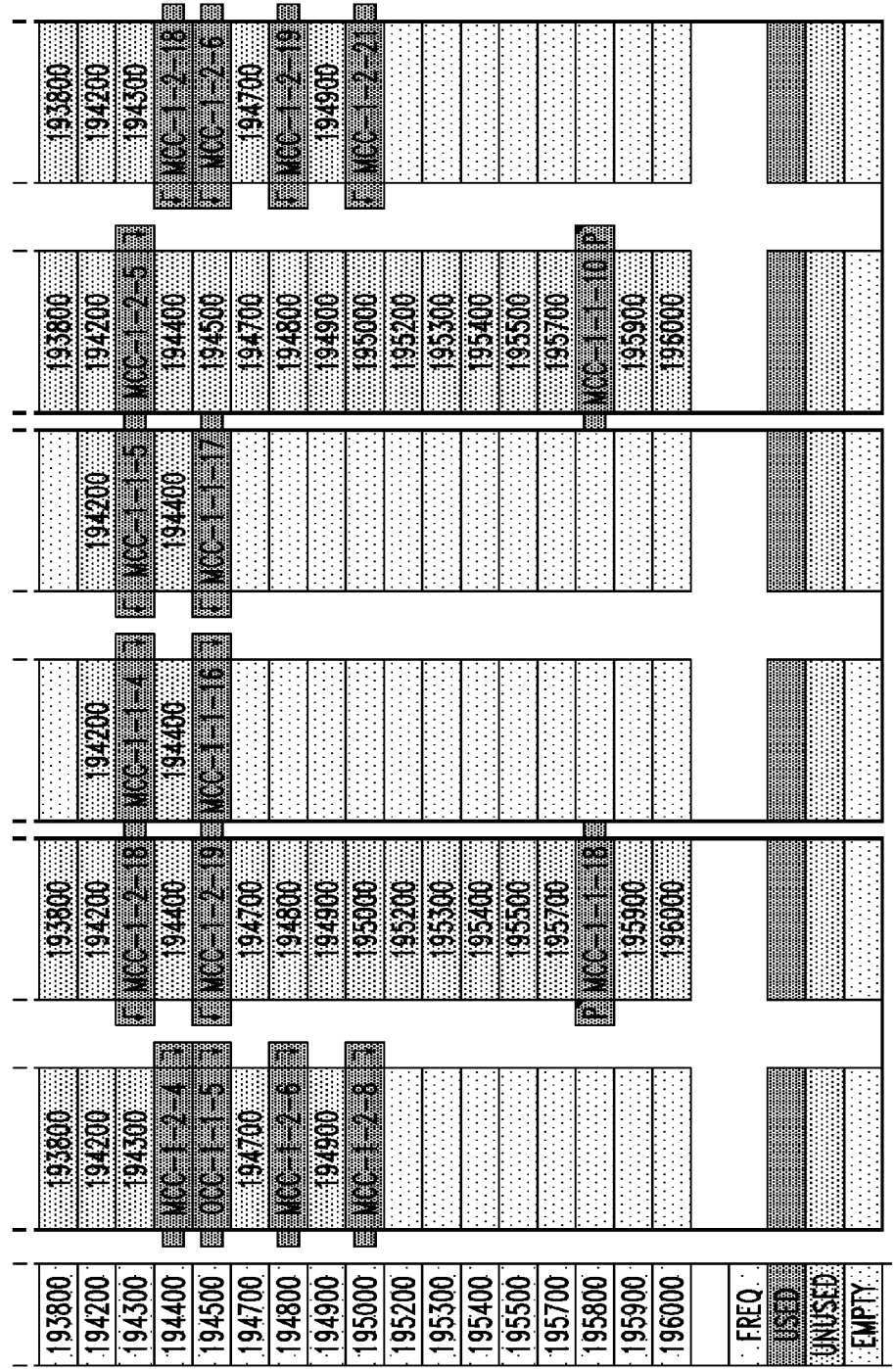

Turning now to FIG. 3C, the methods of FIGS. 2C, 2D and 2E are carried out with respect to the 192100 wavelength traversing the PSC1696-2 node 310. In carrying out the method of FIG. 2C, a fiber pass-through 345 is identified. From an examination of TL1 messages, the following has been determined: (1) the PSC1696-2 node 310 does not add or drop the 192100 wavelength in either the east or west direction, (2) the PSC1696-2 node 310 does multiplex and demultiplex the 192100 wavelength in both the east and west directions, (3) the PSC1696-2 node 310 does not receive the 192100 wavelength from the west direction (from the PSC1696-1 node 305) and (4) the PSC1696-2 node 310 does receive the 192100 wavelength from the east (from the PSC1696-3 node 315). The conclusion is that the PSC1696-2 node 310 must then be passing the 192100 wavelength through, with a signal coming from the PSC1696-3 node 315 and the ports for 192100 on the multiplexer cards must be connected together via crossover fiber for the 192100 wavelength on the PSC1696-2 node 310.

Figure 3D:
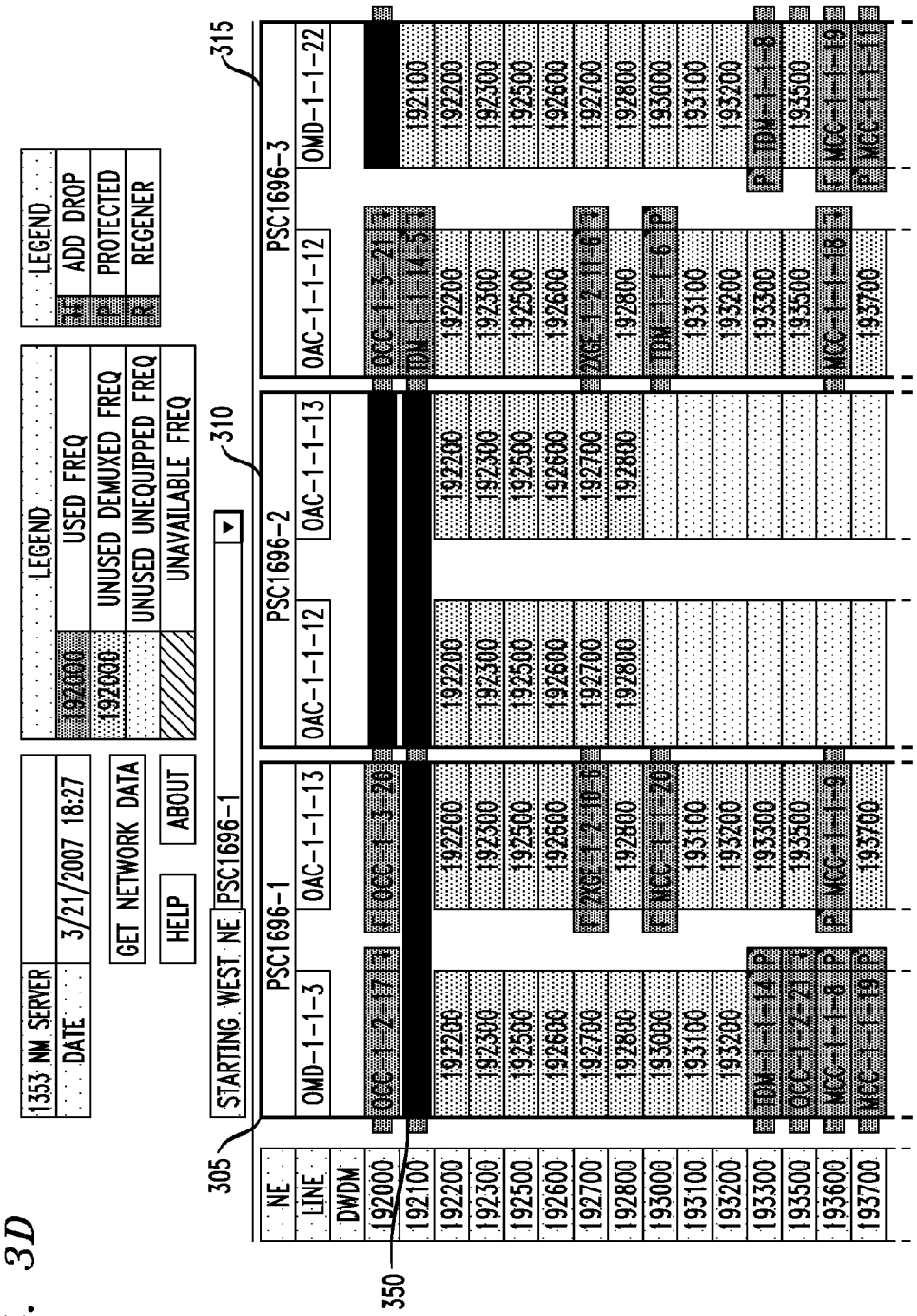
Figure 3D:
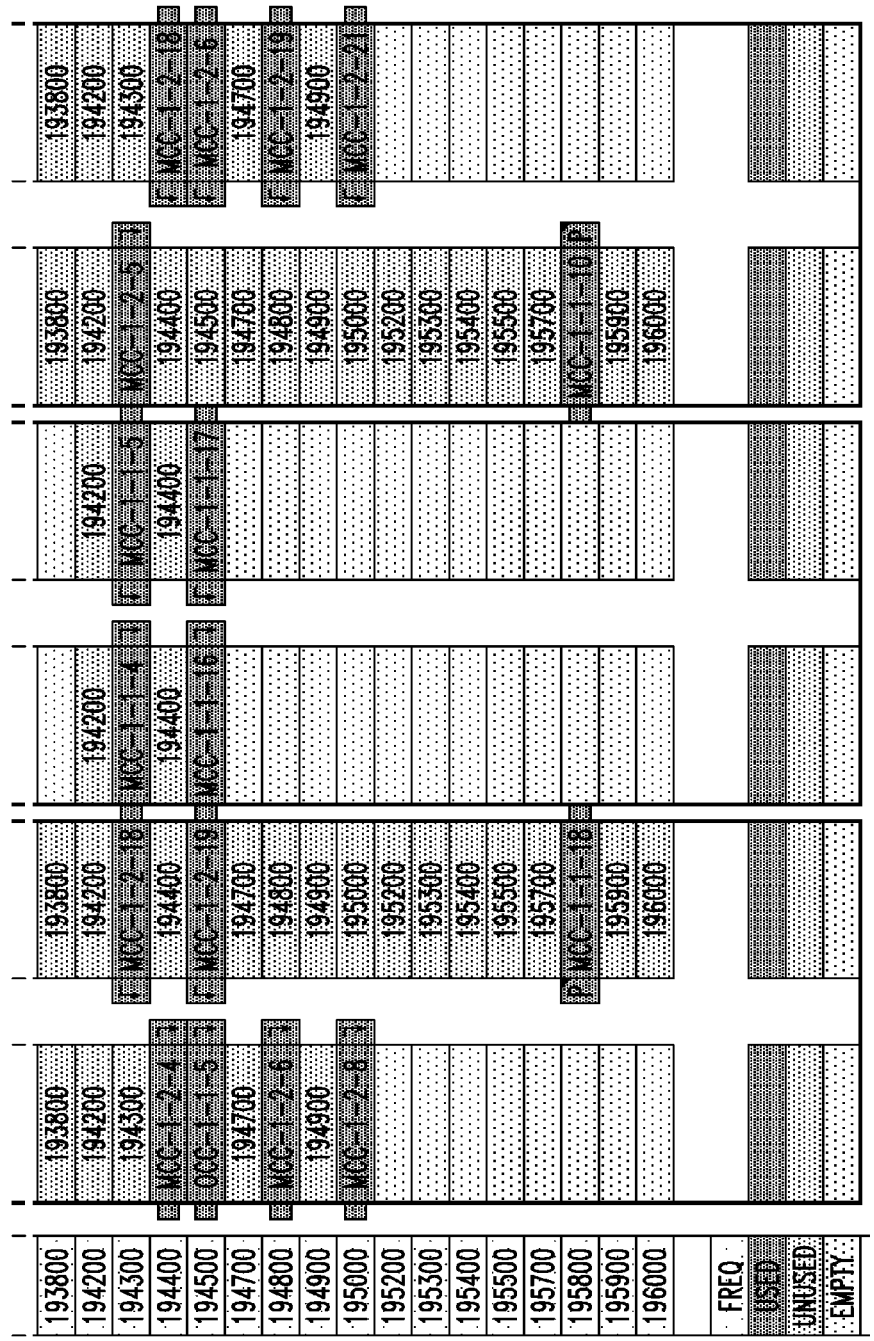

Turning now to FIG. 3D, the methods of FIGS. 2C, 2D and 2E are carried out with respect to the 192100 wavelength traversing the PSC1696-1 node 305. In carrying out the method of FIG. 2C, a fiber pass-through 350 is identified. From an examination of TL1 messages, the following has been determined: (1) the PSC1696-1 node 305 does not add or drop the 192100 wavelength in either the east or west direction, (2) the PSC1696-1 node 305 does multiplex and demultiplex the 192100 wavelength in both the east and west directions, (3) the PSC1696-1 node 305 does not receive the 192100 wavelength from the west direction (from the PSC1696-3 node 315) and (4) the PSC1696-1 node 305 does receives the 192100 wavelength from the east direction (from the PSC1696-2 node 310). The conclusion is that the PSC1696-1 node 305 must then be passing the 192100 wavelength through, with a signal coming from the PSC1696-2 node 310, and the ports for 192100 on the multiplexer cards must be connected together via crossover fiber for the 192100 wavelength on the PSC1696-1 node 305.

Figure 3E:
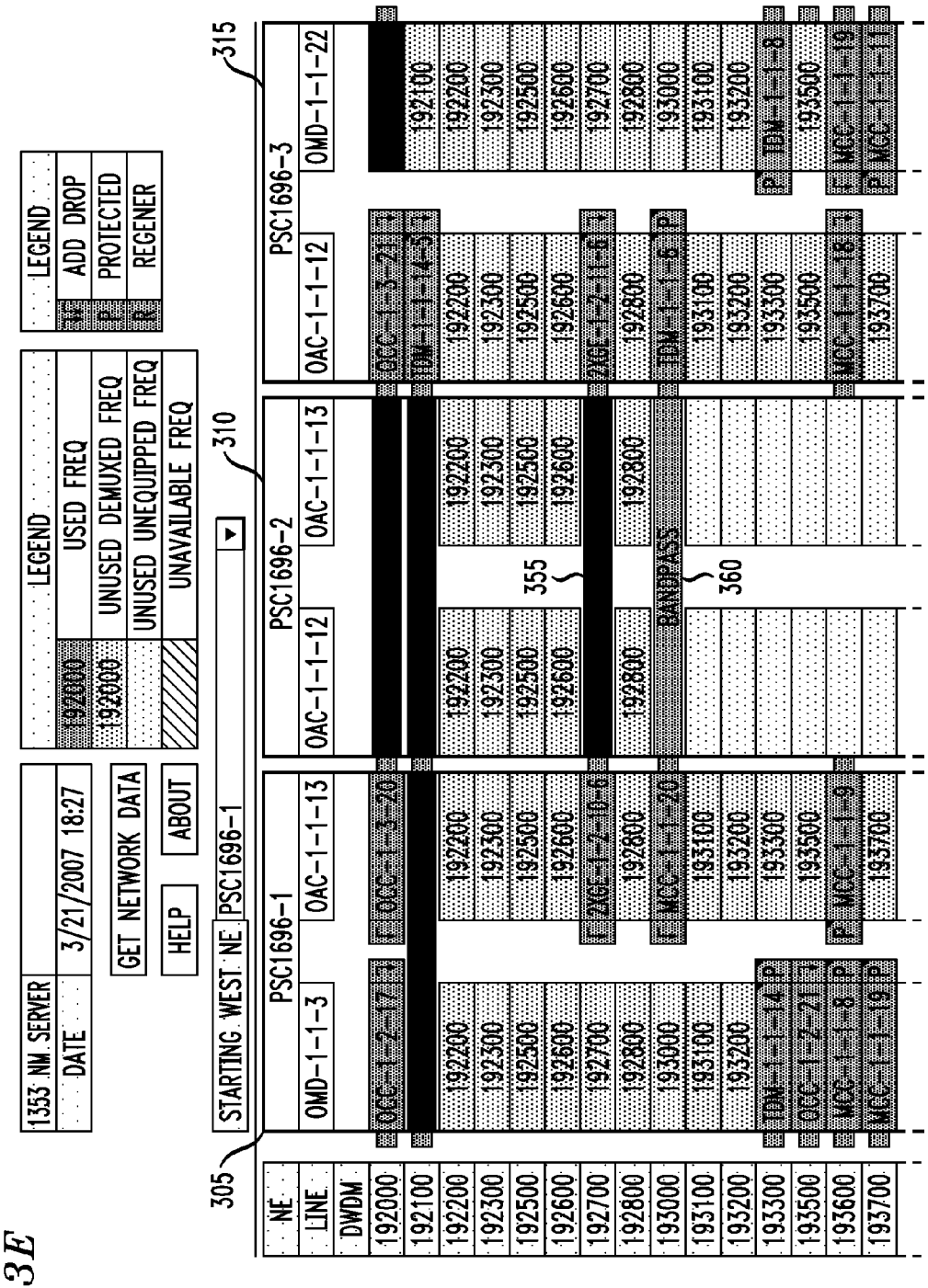
Figure 3E:
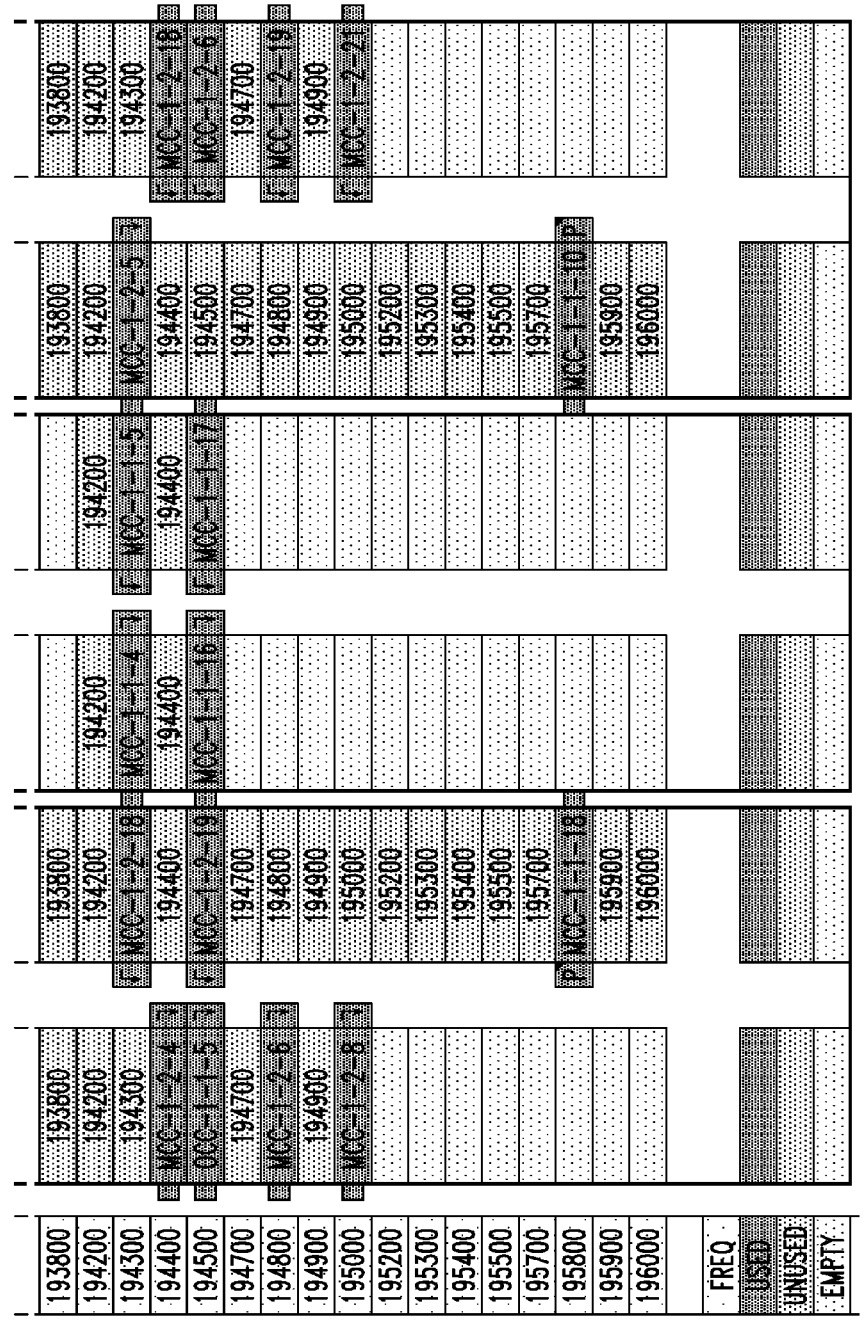

Turning now to FIG. 3E, the methods of FIGS. 2C, 2D and 2E are carried out with respect to the 192700 and 193000 wavelengths traversing the PSC1696-2 node 310. In carrying out the method of FIG. 2C, a fiber pass-through 355 is identified. From an examination of TL1 messages, the following has been determined: (1) the PSC1696-2 node 310 does not add or drop the 192700 wavelength in either the east or west direction, (2) the PSC1696-2 node 310 does multiplex and demultiplex the 192700 wavelength in both the east and west directions, (3) the PSC1696-2 node 310 does not receive the 192700 wavelength from the west direction (from the PSC1696-1 node 305) and (4) the PSC1696-2 node 310 does receives the 192700 wavelength from the east direction (from the PSC1696-3 node 315). The conclusion is that the PSC1696-2 node 310 must then be passing the 192700 wavelength through, with a signal coming from the PSC1696-3 node 315, and the ports for 192700 on the multiplexer cards must be connected together via crossover fiber for the 192700 wavelength on the PSC1696-2 node 310.

In carrying out the method of FIG. 2D, a band pass-through 360 is identified with respect to the 193000 wavelength in the PSC1696-2 node 310. From an examination of TL1 messages, the following has been determined: (1) the PSC1696-2 node 310 does not add or drop the 193000 wavelength in either the east or west direction, (2) the PSC1696-2 node 310 does not multiplex or demultiplex the 193000 wavelength in both the east and west directions, (3) the PSC1696-2 node 310 does receive the 193000 wavelength from the west direction (from the PSC1696-1 node 305) and (4) the PSC1696-2 node 310 does receive the 193000 wavelength from the east direction (from the PSC1696-3 node 315). The conclusion is that the PSC1696-2 node 310 must then be bandpassing the 193000 wavelength through, with a signal coming from the PSC1696-1 node 305 and the PSC1696-3 node 315. The pass-through will occur over the special dedicated bandpass port.

Figure 3F:
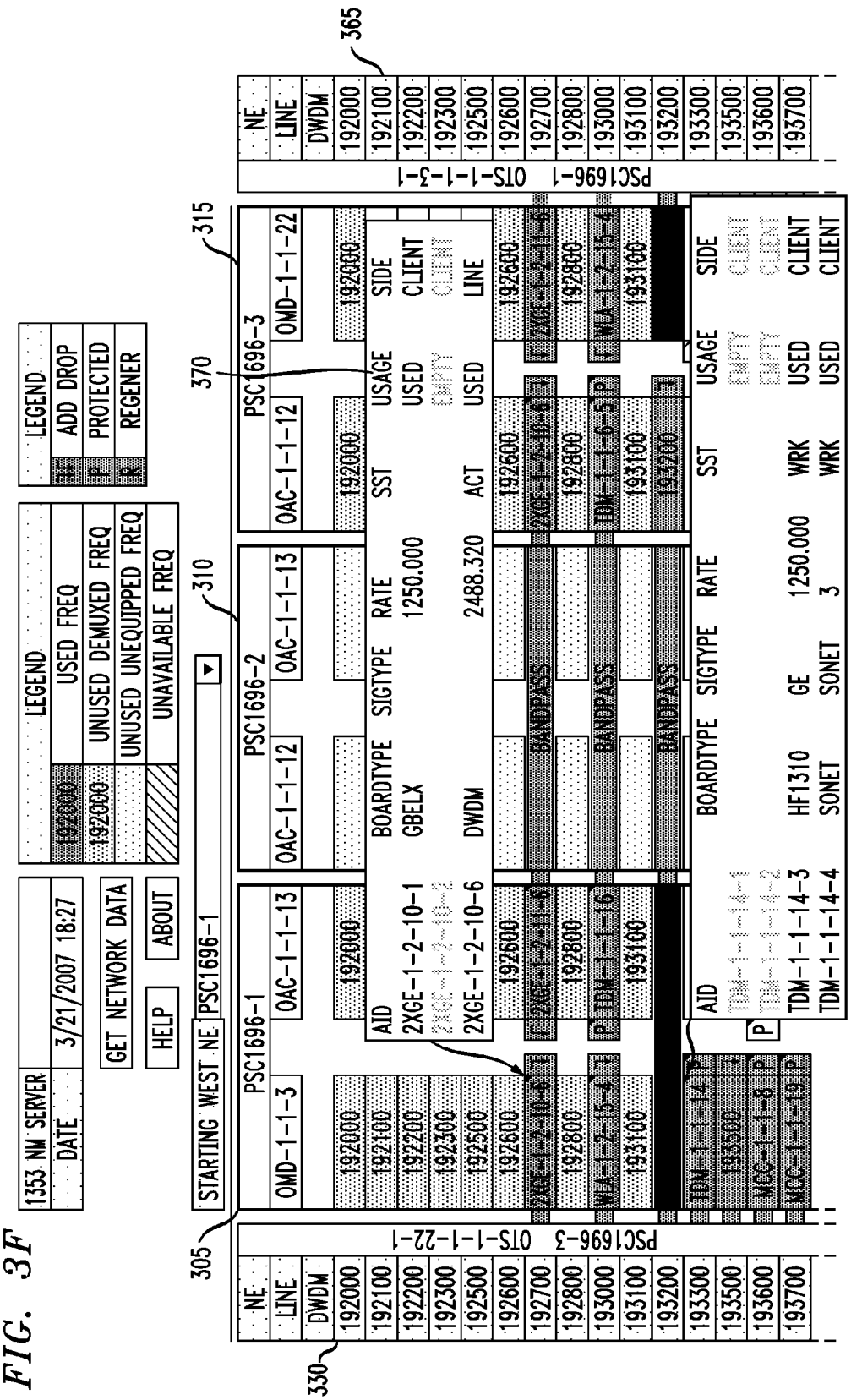
Figure 3F:
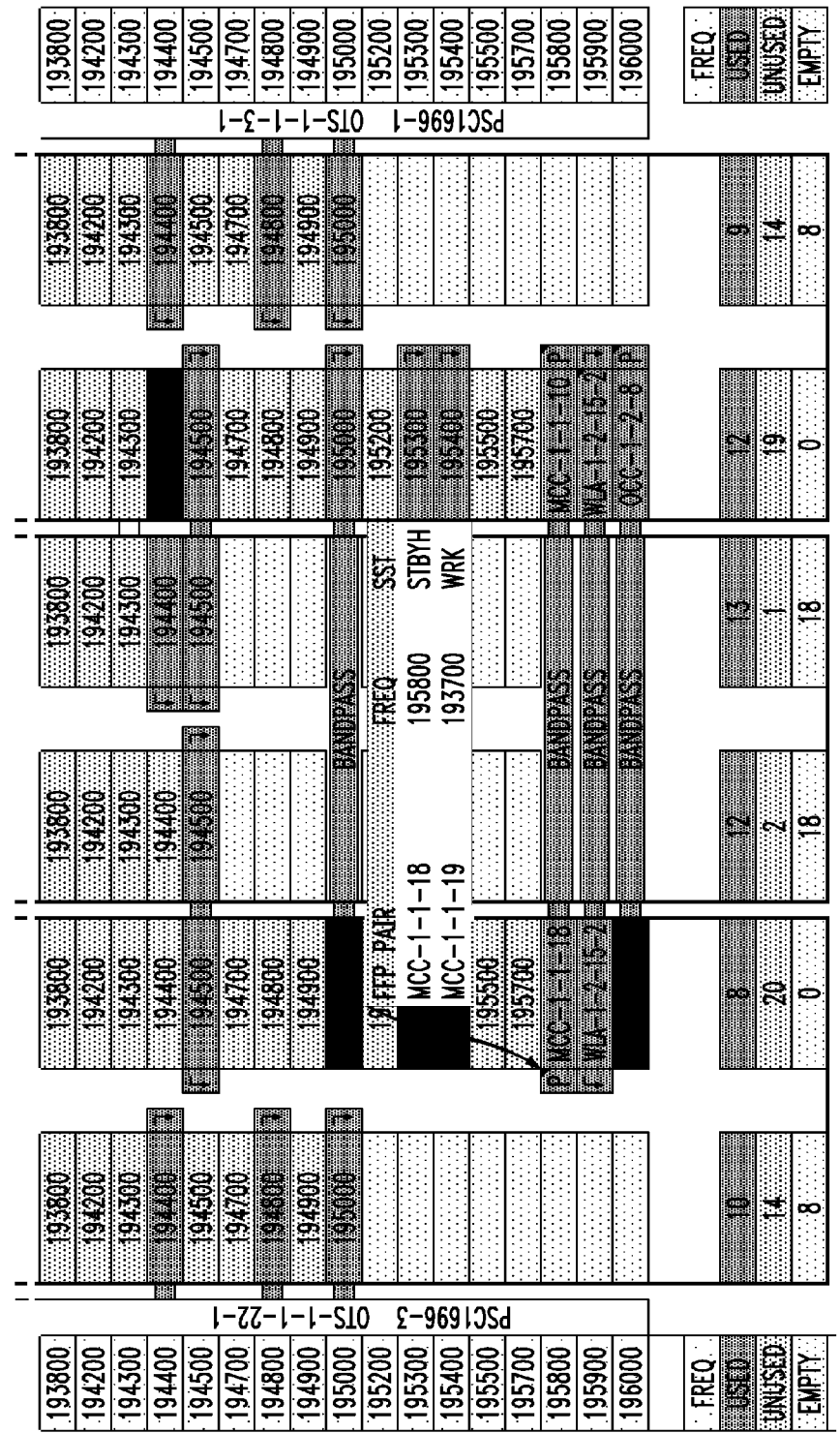

Turning now to FIG. 3F, illustrated is a complete visual representation after the method of FIG. 2A has been carried out. FIG. 3F shows a right-most column 365, which relists the various wavelengths that the left-most column 330 lists and associates these wavelengths with the PSC1696-3 node 315, enhancing the ease with which the visual representation may be used to trace connectivity of each wavelength through the WDM optical network.

FIG. 3F also shows detail boxes that may form part of the visual representation. FIG. 3F shows three such detail boxes, but references only one of them. That detail box, a detail box 370, provides detail regarding a particular OMD having a TID of 2XGE-1-2-10-6. The detail box 370 shows that the transponder 2XGE-1-2-10 has two gigabit Ethernet inputs having access identifiers (AIDs) of 2XGE-1-2-10-1 and 2XGE-1-2-10-2 and a single output multiplexing the two gigabit Ethernet inputs into a single wavelength (FREQ), the equipment supporting this output having an AID of 2XGE-1-2-10-6. Among other things, the detail box 370 also shows the data rates of the inputs 2XGE-1-2-10-1 and 2XGE-1-2-10-2 and whether the inputs 2XGE-1-2-10-1 and 2XGE-1-2-10-2 are used or empty. In the embodiment of FIG. 3F, the detail boxes take the form of Excel® comments. However, the detail boxes may be implemented in another manner and may not be rectangular.

Having described how to generate a visual representation of a WDM optical network, various embodiments of a system and method for generating a visual representation of a node of a WDM optical network will now be described. A visual representation of a node allows a person who is not an expert in WDM optical networking to determine whether or not a particular change (e.g., the addition of a wavelength) may be made to a WDM optical network, how that change may best be made, and particularly whether or not the change will require any resource(s) to be relocated or purchased.

Figure 4:
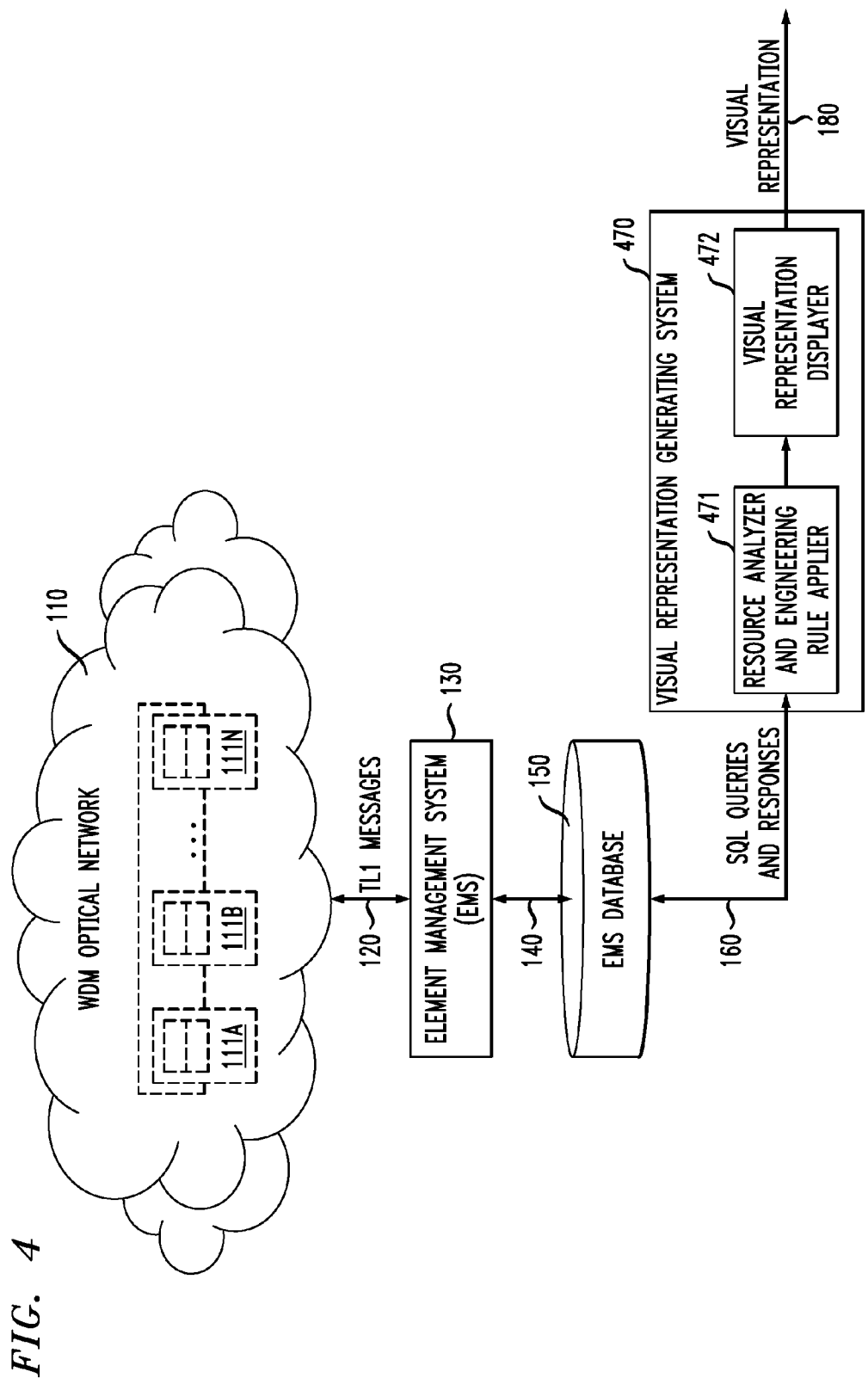
FIG. 4 illustrates a flow diagram of one embodiment of a system for generating a visual representation of a node of a WDM optical network carried out according to the principles of the invention.

FIG. 4 illustrates a flow diagram of one embodiment of a system for generating a visual representation of a node of a WDM optical network carried out according to the principles of the invention. Most of the elements of FIG. 4 are taken from FIG. 1 and are therefore bear the same reference numerals. However, in FIG. 4, a visual representation generating system 470 includes a resource analyzer and engineering rule applier 471 and a visual representation displayer 472 coupled to the resource analyzer and engineering rule applier 471. The resource analyzer and engineering rule applier 471 is configured to identify resources resident at a particular node, store information regarding the resources in a database (or datasheet), sort the resources according to hierarchical level, recursively associate the resources by hierarchical level, store the resource relationships that result from the recursive association as attributes in the database and apply engineering rules to the attributes. The visual representation displayer 472 is configured to extract information from the database to generate the visual representation 180 of the node. The functions performed by the resource analyzer and engineering rule applier 471 and the visual representation displayer 472 will be described in greater detail in conjunction with FIG. 5.

Figure 5:
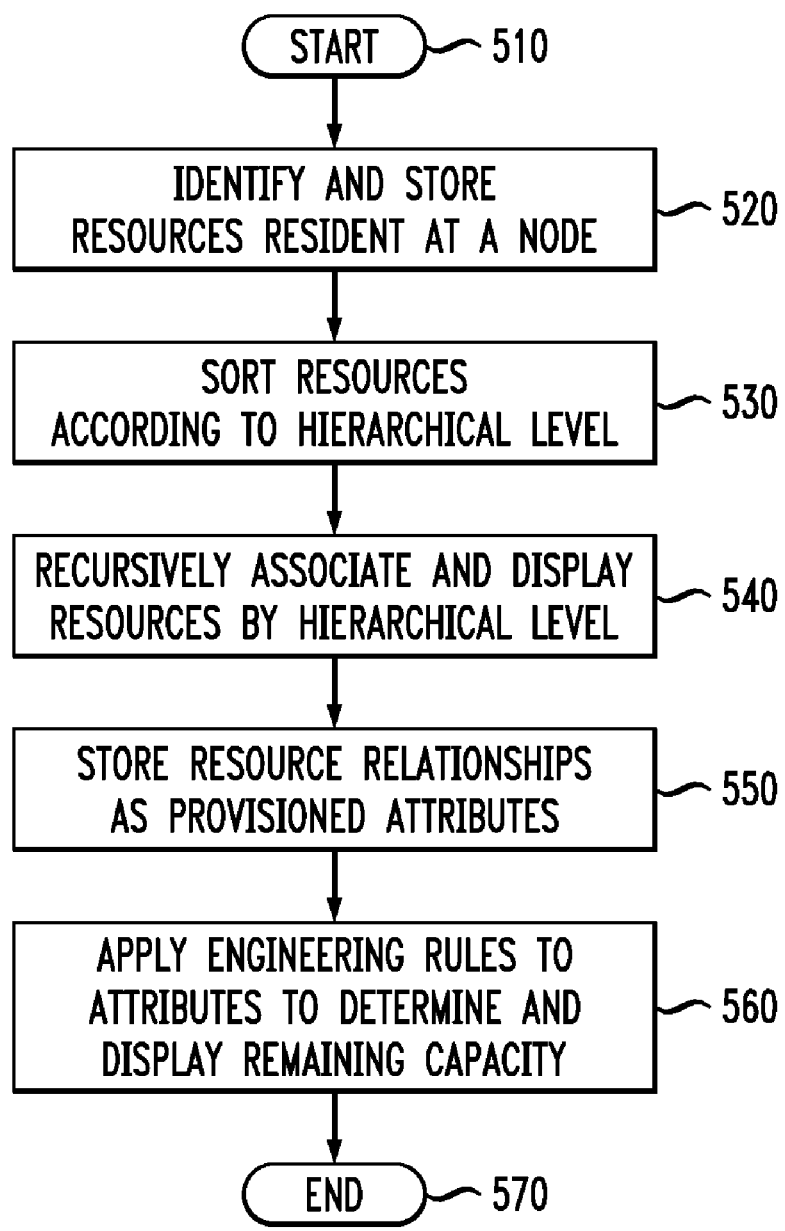
FIG. 5 illustrates a flow diagram of one embodiment of a computer-implemented method of generating a visual representation of a node of a WDM optical network carried out according to the principles of the invention.

FIG. 5 illustrates a flow diagram of one embodiment of a computer-implemented method of generating a visual representation of a node of a WDM optical network carried out according to the principles of the invention. The method begins in a start step 510, when it is desired to generate a visual representation of a node of a WDM optical network. In a step 520, resources resident at a node are identified and stored in a database, which takes the form of one or more datasheets in one embodiment. In a step 530, the resources are sorted according to hierarchical level. For example, resources may be sorted by rack, by shelf, by sub-shelf, by slot, by drawer, by port, by facility and so on as desired.

In a step 540, the resources are recursively associated and displayed by hierarchical level. For example, facilities are associated with ports, ports are associated with cards and any sub-cards, any sub-cards are associated with drawers, cards are associated with slots, and shelves are associated with racks.

In a step 550, the resource relationships that result from the recursive association are stored as attributes in the database (or datasheets), e.g., racknum (rack number), shelfnum (shelf number), slotnum (slot number), subslotnum (sub-slot number), portnum (port number), supporting board. These attributes, together with provisioned attributes, e.g., frequency number, International Telecommunication Union (ITU) frequency identifier, mate identifier and other provisioned attributes, together enable the complete correlation of all objects to each other, as follows.

In a step 560, engineering rules are applied to the attributes. Those who are subject matter experts with respect to the resource that constitutes the WDM optical network are often familiar with its engineering rules. Engineering rules embody the particular capabilities and constraints of the resources. Many possible engineering rules may exist with respect to a given WDM optical network. Some examples are: a particular type of shelf has 24 slots and can support only 20 active cards, slot 0 of the particular type of shelf is reserved for a particular type of card, only two of a particular type of card are allowed in a particular type of shelf, a particular type of OMD has only five inputs, and a particular type of OMD can be daisy-chained at most six deep. Application of a set of engineering rules that pertain to the WDM optical network being visually represented allows any remaining capacity in the WDM optical network to be determined and displayed in the visual representation. The method ends in an end step 570.

FIGS. 6A-B respectively illustrate embodiments of equipment and port datasheets generated during a first phase of the method of FIG. 4. FIG. 6A shows a representative equipment datasheet. The datasheet lists equipment by row and equipment identifiers and attributes by column, including a TID column 605, an AID column 610, an ENTITYTYPE column 615, a RACKNUM column 620, a SHELFNUM column 625, a SUBSHELFNUM column 630, a SLOTNUM column 635, a SUBSLOTNUM column 640, a FREQ (frequency number) column 645, an ITUFREQ (ITU frequency identifier number) column 650 and a MATEID (mating equipment identifier) column 655.

It can be seen in the datasheet of FIG. 6A that the resources resident at a node have been identified and stored, sorted according to hierarchical level and recursively associated by hierarchical level. Further, the resource relationships that result from the recursive association have been stored as attributes in datasheet, e.g., RACKNUM and SHELFNUM. Provisioned attributes are also stored, such as the FREQ column 645, the ITUFREQ column 650 and the MATEID column 655.

FIG. 6B shows a representative port datasheet. The datasheet lists ports by row and port identifiers and attributes by column, including the TID column 605, the AID column 610, the RACKNUM column 620, the SHELFNUM column 625, the SUBSHELFNUM column 630, the SLOTNUM column 635, a PORTNUM (port number) column 660 and a SUPPBOARD (supporting board) column 665.

Figure 7A:
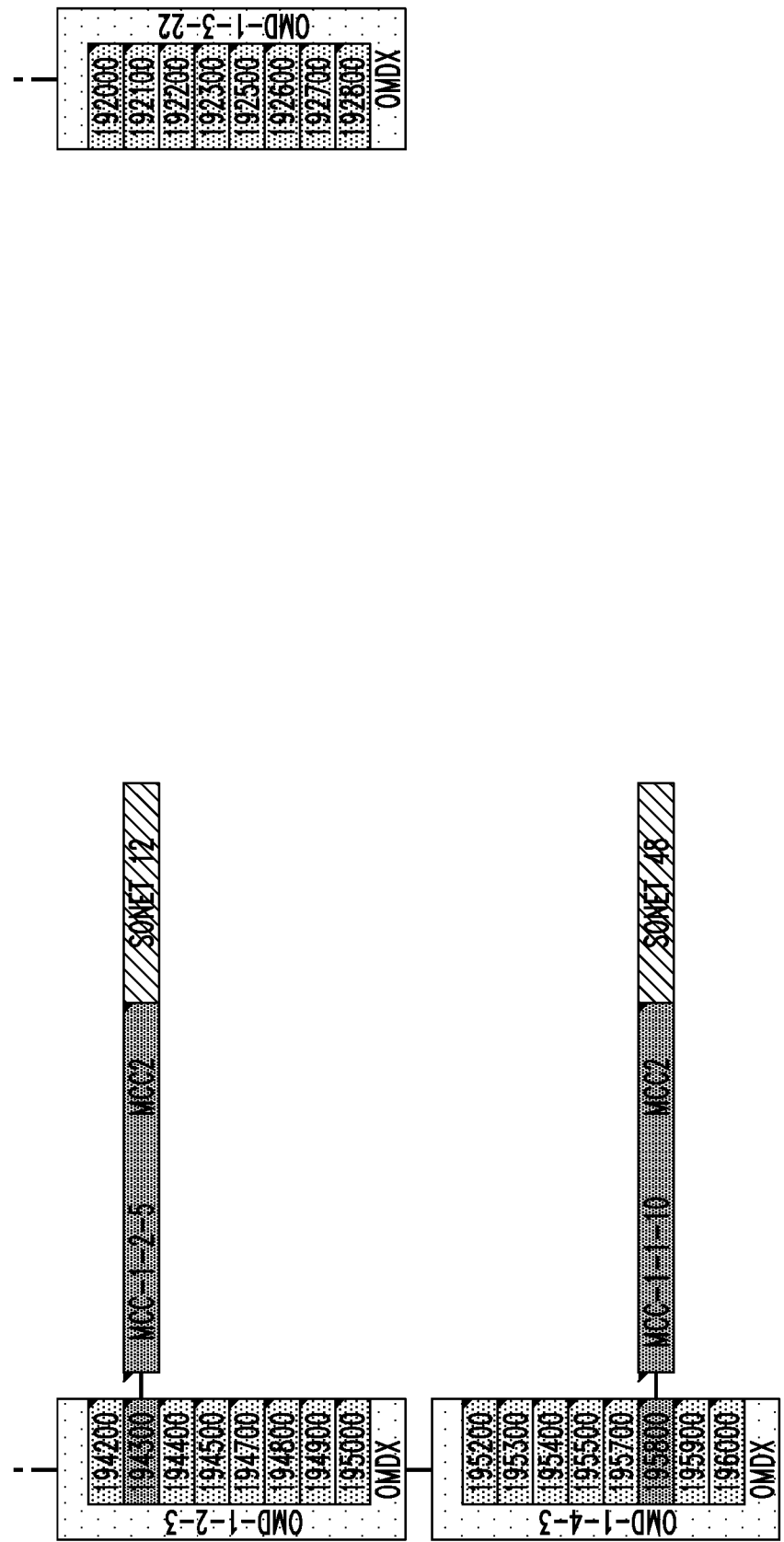
FIGS. 7A-C together illustrate one embodiment of a visual representation of a node of a WDM optical network as it is being generated according to the method of FIG. 5.
Figure 7B:
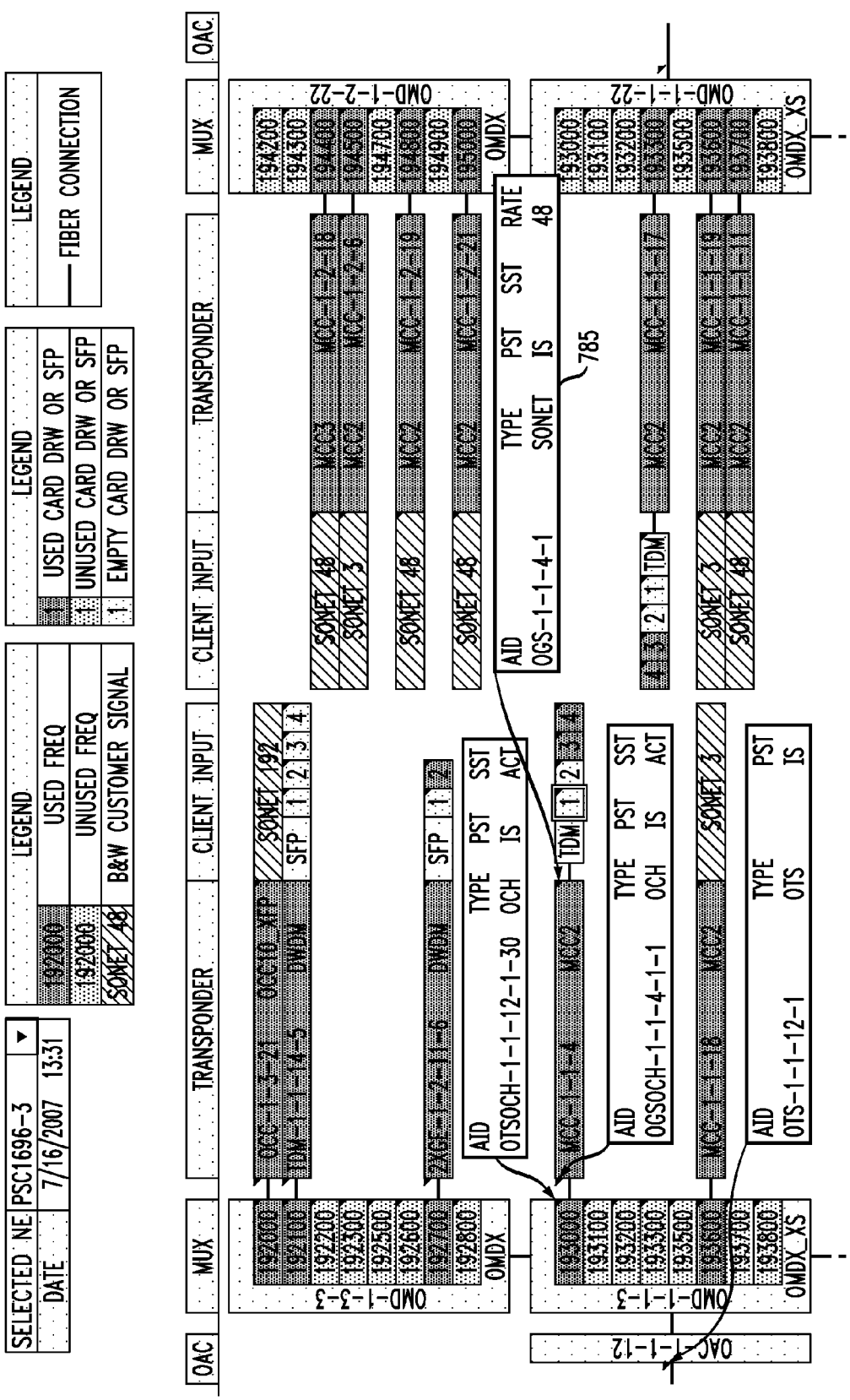
Figure 7B:
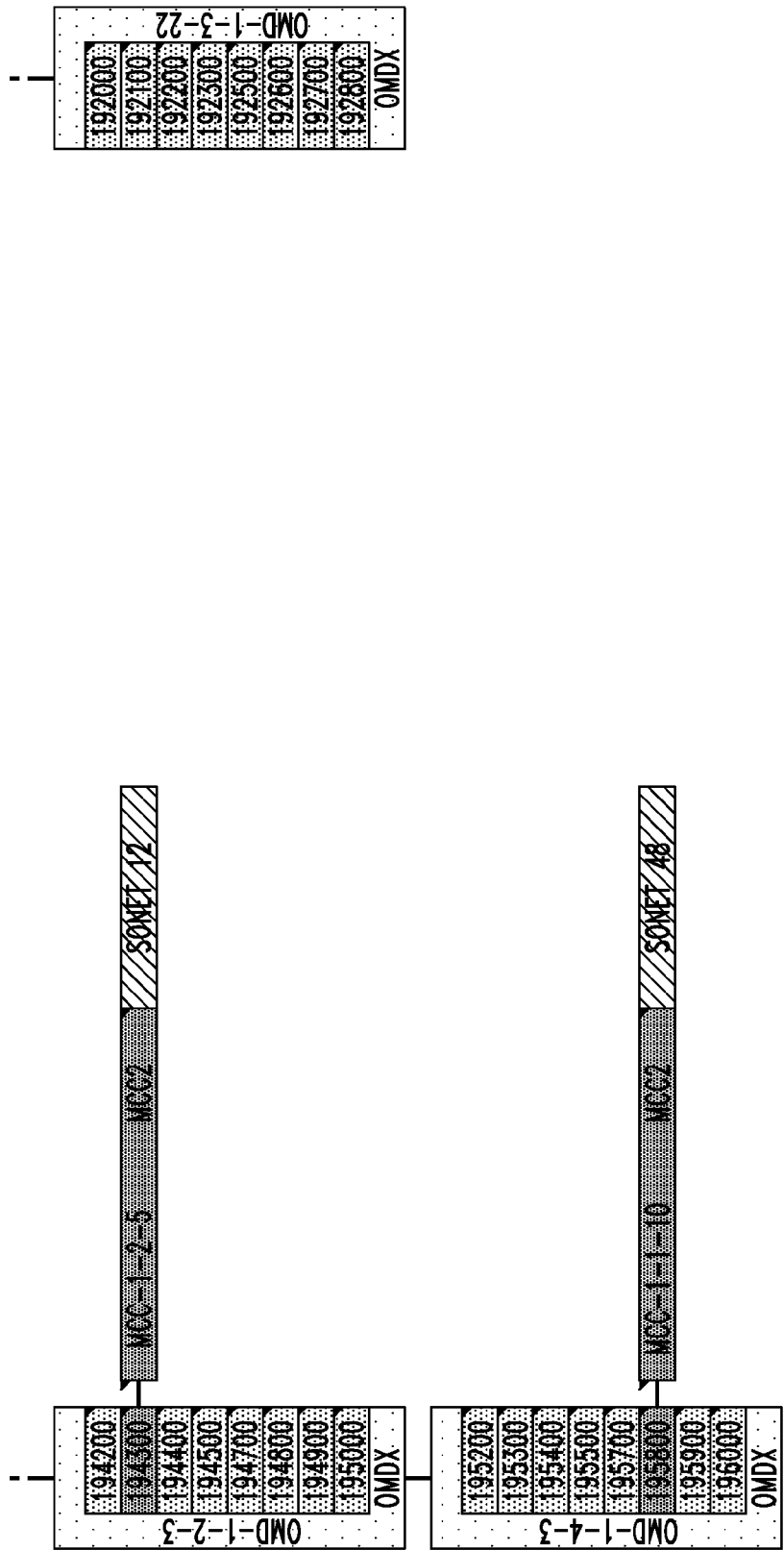
Figure 7C:
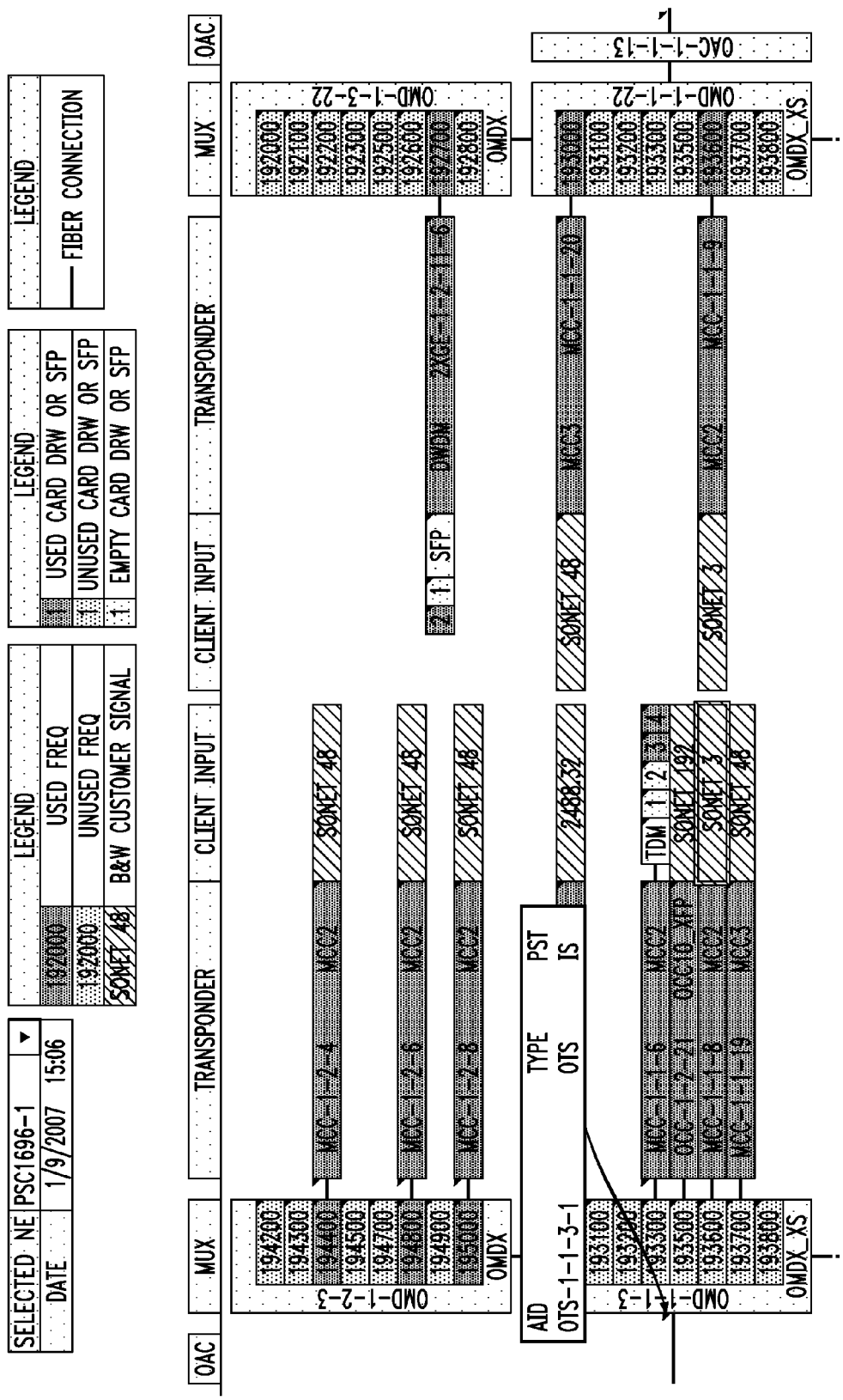
Figure 7C:
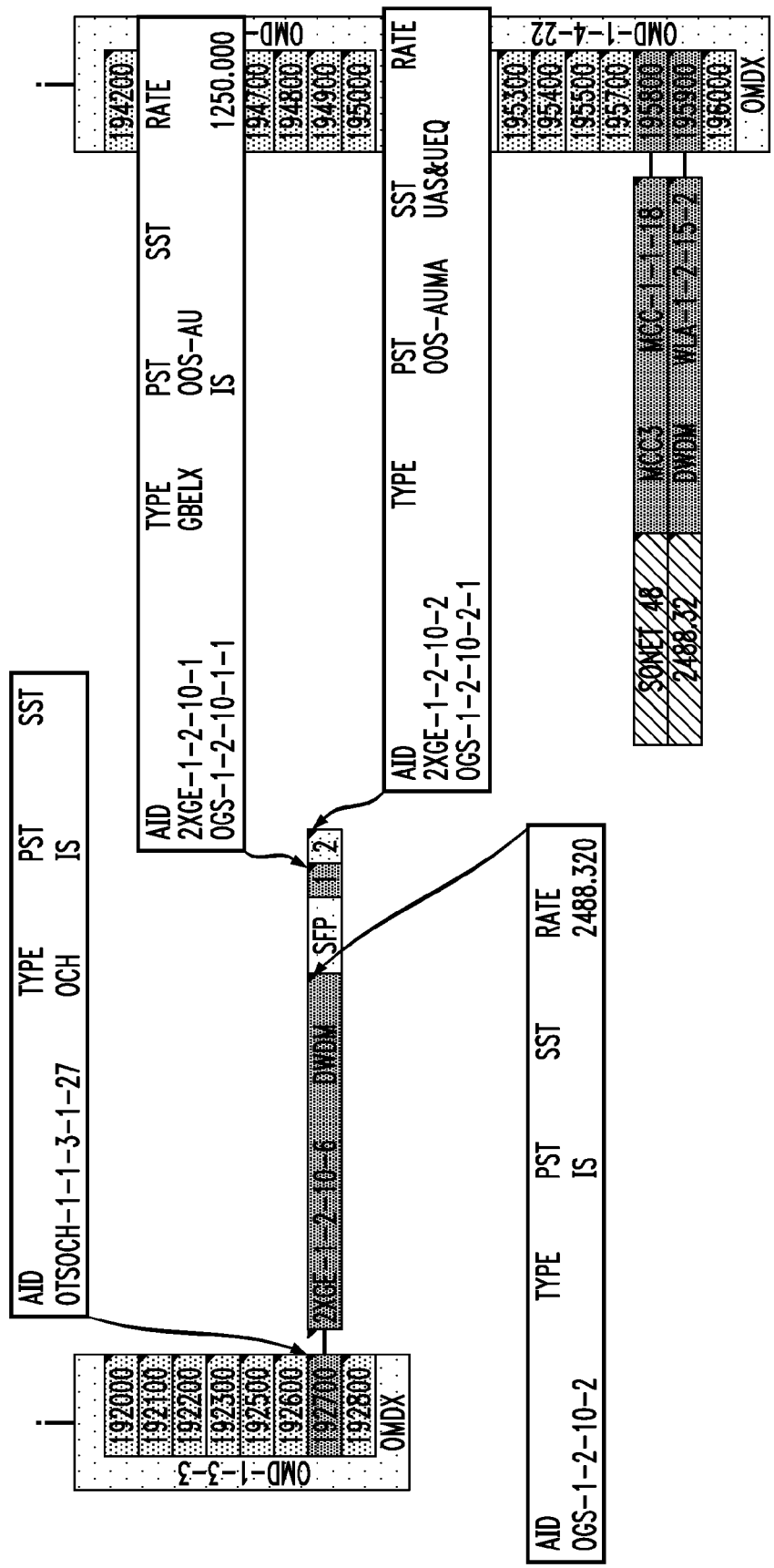

FIGS. 7A-C together illustrate one embodiment of a visual representation of a node of a WDM optical network as it is being generated according to the method of FIG. 4.

Following an examination of data from TL1 messages retrieved from the EMS database of FIG. 1, a node having a TID of PSC1696-3 is selected for visual representation. Nodes in a WDM optical network are characterized by a chain of equipment leading from segments connecting the node to neighboring nodes to customer input and include an optical amplifier card (OAC), OMDs (either standalone or daisy-chained), transponders and time-domain multiplexers (TDMs). Accordingly, the visual representation sets forth the PSC1696-3 node in a connectivity relation in which segments to neighboring nodes are listed in left-most and right-most columns and client (i.e., customer) inputs are listed in central columns. An OAC column 705, a multiplexer (MUX) column 710, a transponder column 715 and a client input column 720 represent one "side" of the PSC1696-3 node. A client input column 725, a transponder column 730, a MUX column 735 and an OAC column 740 represent the other "side" of the PSC1696-3 node. All of the wavelengths that the PSC1696-3 node adds or drops in each direction in the WDM optical network have been displayed as rows.

A left-hand legend 745 sets forth three categories for the status of each wavelength (or frequency): used frequencies, unused but demultiplexed frequencies and single-wavelength (colloquially called black-and-white, or B&W) customer frequencies. Used frequencies are already used and thus unavailable to increase the wavelength capacity of the WDM optical network. Unused but demultiplexed frequencies are available to increase wavelength capacity, but require a transponder to be added.

A central legend 750 sets forth three categories for the slots of a particular shelf, drawers of a particular card or ports of a particular card or sub-card: used, unused and empty. Those skilled in the pertinent art understand what these terms mean. A right-most legend 755 sets forth the symbol for a fiber connection.

It is straightforward to use the visual representation of FIG. 7A to trace connectivity through the PSC1696-3 node. An OAC 160 having the TID OAC-1-1-12 is connected to an OMD 165 having a TID OMD-1-1-3. A 192100 wavelength 770 is derived from and provided to a transponder 775. The transponder 775 is coupled to a Synchronous Optical NETwork (SONET) 192 client input 780.

FIG. 7B illustrates optional detail boxes for the visual representation of FIG. 7A. One detail box 785 provides detail regarding a particular transponder having an AID of OGS-1-1-4-1. The detail box 785 shows that the transponder OGS-1-1-4-1 is of the SONET type supporting an OC-48 data rate.

FIG. 7C illustrates a visual representation of another node in the WDM optical network having a TID of PSC1696-1. The visual representation of FIG. 7C has the same organization as that of FIGS. 7A and 7B, but a different configuration of equipment. Detail boxes (shown but not referenced) in the visual representations of FIGS. 7B and 7C allow a person evaluating the WDM optical network for a potential change to compare unused capacities in the PSC1696-1 and PSC1696-3 nodes to determine whether, for example, a new wavelength can be added between the PSC1696-1 and PSC1696-3 nodes and, if so, what additional resources, if any, may be required to effect the addition of the new wavelength.

Those skilled in the art to which the invention relates will appreciate that other and further additions, deletions, substitutions and modifications may be made to the described embodiments without departing from the scope of the invention.

What is claimed is:

1. A system for generating a visual representation of a wavelength division multiplexing (WDM) optical network, comprising:
a connectivity, pass-through and error identifier configured to identify connectivity and any pass-throughs and termination errors with respect to at least some nodes of said WDM optical network, wherein said identifying comprises:
examining data from standard protocol transaction language messages to determine resource relationships;
identifying wavelength drops and adds based on said examining; and
identifying protected and regenerated wavelengths; and
a connectivity, pass-through and error displayer coupled to said connectivity, pass-through and error identifier and configured to generate said visual representation that indicates said connectivity and said any pass-throughs and termination errors.

2. The system as recited in claim 1 wherein said connectivity, pass-through and error identifier is further configured to generate queries to obtain information regarding network entities in said WDM optical network from a database.

3. The system as recited in claim 1 wherein said connectivity, pass-through and error identifier is configured to identify connectivity and any pass-throughs and termination errors with respect to all nodes of said WDM optical network.

4. The system as recited in claim 1 wherein said visual representation contains detail boxes configured to provide detail regarding resources in said WDM optical network.

5. A computer-implemented method of generating a visual representation of a wavelength division multiplexing (WDM) optical network, comprising:
examining, by a processor of said computer, data from standard protocol transaction language messages to determine resource relationships;
identifying, by said processor of said computer, with respect to at least some nodes of said WDM optical network:
connectivity and pass-throughs;
termination errors;
wavelength adds and drops; and
protected and regenerated wavelengths; and
generating, by said processor of said computer, said visual representation that indicates on a display of said computer:
said connectivity and said any pass-throughs and termination errors;
said wavelength adds and drops; and
said protected and regenerated wavelengths.

6. The method as recited in claim 5 wherein said identifying comprises generating queries to obtain information regarding network entities in said WDM optical network from a database.

7. The method as recited in claim 5 wherein said identifying comprises identifying connectivity and any pass-throughs and termination errors with respect to all nodes of said WDM optical network.

8. The method as recited in claim 5 wherein said visual representation contains detail boxes configured to provide detail regarding resources in said WDM optical network.

9. The method as recited in claim 5 wherein said displaying comprises displaying said at least some nodes left-to-right in connection sequence.

10. The method as recited in claim 5 wherein said identifying comprises identifying a fiber pass-through by:
determining whether a particular wavelength has been added or dropped in a direction;
determining whether said particular wavelength is multiplexed in both directions;
determining whether said particular wavelength is received from one direction; and
determining whether said particular wavelength is transmitted to another direction.

11. The method as recited in claim 5 wherein said identifying comprises identifying a band pass-through by:
determining whether a particular wavelength has been added or dropped in one direction;
determining whether said particular wavelength is multiplexed in both directions;
determining whether said particular wavelength is received from said one direction; and
determining whether the particular wavelength is transmitted to the other direction.

12. The method as recited in claim 5 wherein said identifying comprises identifying a termination error by:
determining whether a particular wavelength has been received from one direction;
determining whether said particular wavelength is demultiplexed in said one direction;
determining whether said particular wavelength has been received from another direction; and
determining whether said particular wavelength is demultiplexed in said other direction.

* * * * *